(12) United States Patent
Haginoya

(10) Patent No.: US 11,047,279 B2
(45) Date of Patent: Jun. 29, 2021

(54) WARM-UP DEVICE

(71) Applicant: SUBARU CORPORATION, Tokyo (JP)

(72) Inventor: Satoshi Haginoya, Tokyo (JP)

(73) Assignee: SUBARU CORPORATION, Tokyo (JP)

(*) Notice: Subject to any disclaimer, the term of this patent is extended or adjusted under 35 U.S.C. 154(b) by 0 days.

(21) Appl. No.: 16/735,314

(22) Filed: Jan. 6, 2020

(65) Prior Publication Data

US 2020/0300142 A1   Sep. 24, 2020

(30) Foreign Application Priority Data

Mar. 19, 2019 (JP) ............................. JP2019-051900

(51) Int. Cl.
| | |
|---|---|
| *F01N 3/20* | (2006.01) |
| *F01N 3/04* | (2006.01) |
| *F01N 9/00* | (2006.01) |
| *F01N 3/02* | (2006.01) |

(52) U.S. Cl.
CPC ......... *F01N 3/2026* (2013.01); *F01N 3/0205* (2013.01); *F01N 3/043* (2013.01); *F01N 3/2013* (2013.01); *F01N 9/00* (2013.01)

(58) Field of Classification Search
CPC .... F01N 3/2026; F01N 3/0205; F01N 3/2013; F01N 3/043; F01N 9/00; F01N 2900/1602; F01N 3/2006
See application file for complete search history.

(56) References Cited

U.S. PATENT DOCUMENTS

| | | | | |
|---|---|---|---|---|
| 5,388,404 | A * | 2/1995 | Tsumura | F01N 9/00 60/284 |
| 2008/0275600 | A1* | 11/2008 | Rask | B60W 20/50 701/22 |
| 2010/0043413 | A1* | 2/2010 | Orihashi | F01N 13/1805 60/320 |
| 2013/0030637 | A1 | 1/2013 | Yamamoto et al. | |
| 2018/0252196 | A1* | 9/2018 | Ferraris | F01P 7/165 |

FOREIGN PATENT DOCUMENTS

JP            5714239 B2    5/2015

* cited by examiner

*Primary Examiner* — Brandon D Lee
(74) *Attorney, Agent, or Firm* — McDermott Will & Emery LLP

(57) ABSTRACT

A warm-up device includes a heating mechanism, a refrigerant reservoir, and a refrigerant transmitter. The heating mechanism heats a purification catalyst provided to an exhaust pipe. The refrigerant reservoir stores, in a heat insulating manner, a refrigerant whose heat is exchanged with the heated purification catalyst. The refrigerant transmitter transmits the refrigerant stored in the refrigerant reservoir to an object to be warmed up.

7 Claims, 18 Drawing Sheets

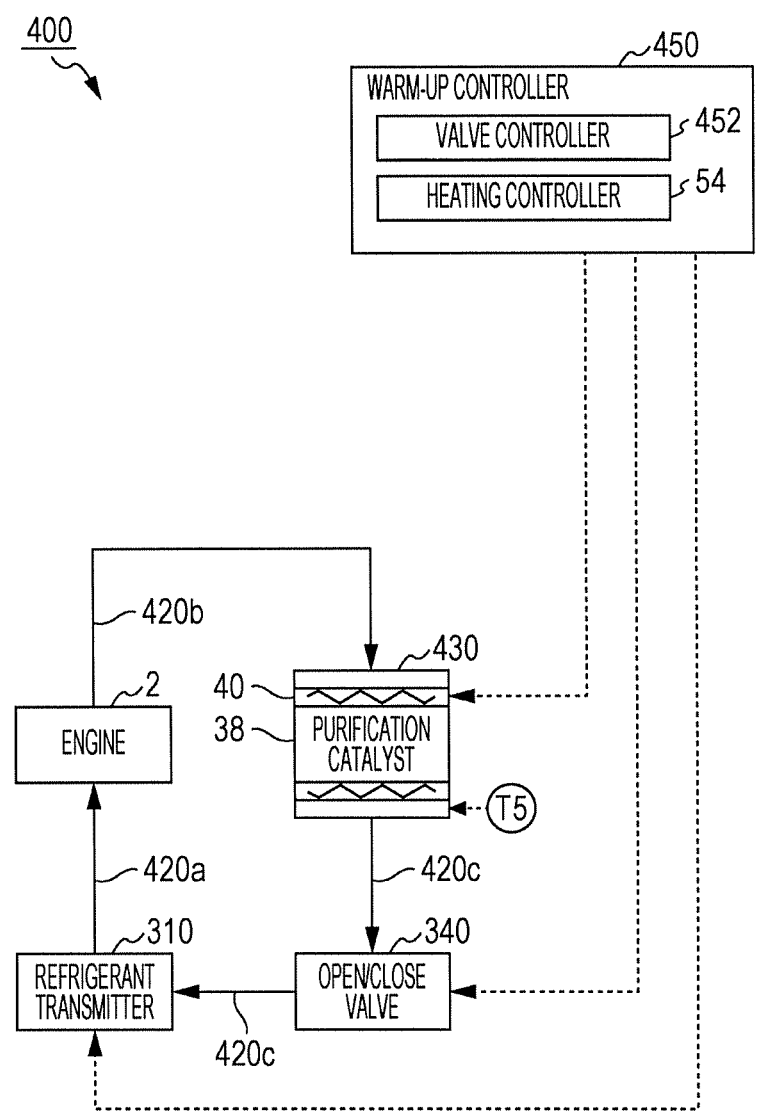

WARM-UP DEVICE

CROSS-REFERENCE TO RELATED APPLICATIONS

The present application claims priority from Japanese Patent Application No. 2019-051900 filed on Mar. 19, 2019, the entire contents of which are hereby incorporated by reference.

BACKGROUND

The disclosure relates to a warm-up device.

Exhaust gas exhausted from an engine contains regulated substances such as hydrocarbon (HC), carbon monoxide (CO), and nitrogen oxide (NOx). Therefore, an exhaust pipe of a vehicle is provided with a purification catalyst that purifies HC, CO, and NOx. The activation temperature of the purification catalyst is higher than normal temperature (for example, 200° C. or higher). Therefore, immediately after the start of the engine, the temperature of the purification catalyst does not reach the activation temperature, so there is a risk that the regulated substances are discharged to the outside of the vehicle.

Therefore, a technique that uses an electric heater for heating the purification catalyst, warms up the purification catalyst by the electric heater before the engine is started, and starts the engine after the warm-up is completed has been developed (for example, Japanese Patent No. 5714239).

SUMMARY

An aspect of the disclosure provides a warm-up device. The device includes a heating mechanism, a refrigerant reservoir, and the a refrigerant transmitter. The heating mechanism heats a purification catalyst provided to an exhaust pipe. The refrigerant reservoir stores, in a heat insulating manner, a refrigerant whose heat is exchanged with the heated purification catalyst. The refrigerant transmitter that transmits the refrigerant stored in the refrigerant reservoir to an object to be warmed up.

BRIEF DESCRIPTION OF THE DRAWINGS

The accompanying drawings are included to provide a further understanding of the disclosure and are incorporated in and constitute a part of this specification. The drawings illustrate example embodiments and, together with the specification, serve to explain the principles of the disclosure.

FIG. 9 is a first diagram for explaining a flow of cooling water when the heater is on;

FIG. 10 is a second diagram for explaining the flow of cooling water when the heater is on;

FIG. 11 is a third diagram for explaining the flow of cooling water when the heater is on;

FIG. 12 is a fourth diagram for explaining the flow of cooling water when the heater is on;

FIG. 13 is a fifth diagram for explaining the flow of cooling water when the heater is on;

FIG. 18 is a diagram for explaining a warm-up device of a second modified example.

DETAILED DESCRIPTION

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

In the technique of Japanese Patent No. 5714239, there is a problem that when the engine is not started even though the purification catalyst is warmed up, energy used to warm up the purification catalyst is wasted.

It is desirable to provide a warm-up device that can effectively use the energy used to warm up the purification catalyst.

Figure 1:
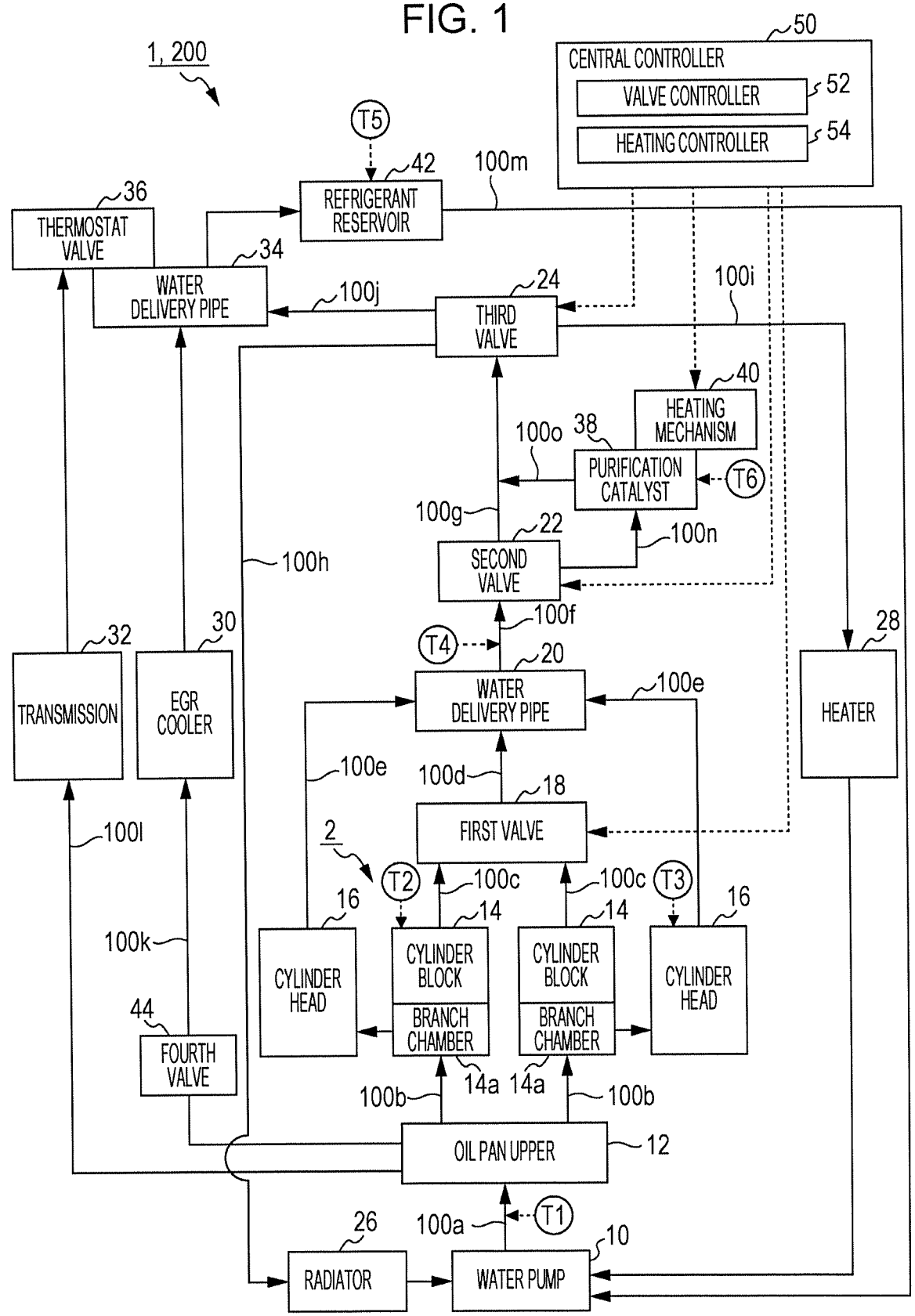
FIG. 1 is a diagram for explaining a configuration of a vehicle.

FIG. 1 is a diagram for explaining a configuration of a vehicle 1. In FIG. 1, solid arrows indicate cooling flow paths 100 (100a to 100o in FIG. 1) and dashed arrows indicate signal flows. As illustrated in FIG. 1, the vehicle 1 is provided with a water pump 10, an oil pan upper 12, an engine 2 (cylinder blocks 14 and cylinder heads 16), a first valve 18, a water delivery pipe 20, a second valve 22, a third valve 24, a radiator 26, a heater 28, an EGR cooler 30, a transmission 32, a water delivery pipe 34, a thermostat valve 36, a purification catalyst 38, a heating mechanism 40, a refrigerant reservoir 42, a fourth valve 44, a central controller 50, and temperature sensors T1 to T6. In the vehicle 1, cooling water is circulated through these components via the cooling flow paths 100. In one embodiment, the vehicle 1 is mounted with a cooling mechanism 200 including the water pump 10, the first valve 18, the water delivery pipe 20, the second valve 22, the third valve 24, the radiator 26, the water delivery pipe 34, the thermostat valve 36, the heating mechanism 40, the refrigerant reservoir 42, the fourth valve 44, the central controller 50, and the temperature sensors T1 to T6.

The water pump 10 (a refrigerant transmitter, a refrigerant heat exchanger) is coupled to a pump discharge flow path 100a, a radiator flow path 100h, a heater flow path 100i, and a bypass flow path 100m. The water pump 10 is driven when power is supplied from a battery not illustrated in the drawings and discharges the cooling water flowing in from the radiator flow path 100h, the heater flow path 100i, and the bypass flow path 100m to the pump discharge flow path 100a.

The oil pan upper 12 is coupled to the pump discharge flow path 100a, a block inflow flow path 100b, an EGR flow path 100k, and a transmission flow path 100l. The cooling water flowing from the water pump 10 through the pump discharge flow path 100a temporarily flows into the oil pan upper 12, and the oil pan upper 12 ejects the flowing-in cooling water to the block inflow flow path 100b, the EGR flow path 100k, and the transmission flow path 100l.

The engine 2 is a so-called horizontally opposed engine where a pair of cylinder blocks 14 and a pair of cylinder heads 16 are included and the pair of cylinder blocks 14 are disposed opposite to each other in a substantially horizontal direction. A driving torque of the engine 2 is changed by the transmission and transmitted to wheels. The cylinder block 14 is provided with a branch chamber 14a that branches the cooling water into the cylinder block 14 and the cylinder head 16. Although, in FIG. 1, the pair of cylinder blocks 14 and the pair of cylinder heads 16 are separated from each other, actually the pair of cylinder blocks 14 are coupled to face each other and the cylinder heads 16 are coupled to the cylinder blocks 14, respectively.

The cylinder block 14 is located on the downstream side of the branch chamber 14a, is coupled to a block ejection flow path 100c through which the cooling water that has circulated inside the cylinder block 14 is ejected, and is coupled to the cylinder head 16 through the branch chamber 14a. The cylinder head 16 is coupled to a head flow path 100e through which the cooling water that has circulated inside the cylinder head 16 is ejected.

The first valve 18 is an ON/OFF valve which is coupled to the block ejection flow paths 100c and a valve flow path 100d and can switch between an open state where the block ejection flow path 100c and the valve flow path 100d are communicated with each other and a closed state where the block ejection flow path 100c and the valve flow path 100d are disconnected from each other. In the open state, the first valve 18 ejects the cooling water flowing in from the block ejection flow path 100c to the valve flow path 100d. On the other hand, in the closed state, the first valve 18 blocks the cooling water flowing in from the block ejection flow path 100c and does not eject the cooling water to the valve flow path 100d.

The water delivery pipe 20 is coupled to the valve flow path 100d, the head flow path 100e, and a second valve inflow flow path 100f and ejects the cooling water flowing in from the valve flow path 100d and the head flow path 100e to the second valve inflow flow path 100f. That is to say, the water delivery pipe 20 causes the cooling water circulated in the engine 2 to flow into the second valve 22.

The second valve 22 is a switching valve coupled to the second valve inflow flow path 100f, a third valve inflow flow path 100g, and a catalyst inflow flow path 100n. The second valve 22 switches between a first state where the second valve inflow flow path 100f and the third valve inflow flow path 100g are communicated with each other and the second valve inflow flow path 100f and the catalyst inflow flow path 100n are disconnected from each other and a second state where the second valve inflow flow path 100f and the catalyst inflow flow path 100n communicate with each other and the second valve inflow flow path 100f and the third valve inflow flow path 100g are disconnected from each other.

The third valve 24 is a rotary valve coupled to the third valve inflow flow path 100g, the radiator flow path 100h, the heater flow path 100i, and a water delivery flow path 100j. When a rotary rotates, the third valve 24 switches flow paths (the radiator flow path 100h, the heater flow path 100i, and the water delivery flow path 100j) coupled to the third valve inflow flow path 100g as described later in detail.

The radiator 26 is provided in the middle of the radiator flow path 100h and cools the cooling water by radiating heat of the cooling water to the outside. The heater 28 is provided in the middle of the heater flow path 100i and radiates heat of the cooling water to the inside of the vehicle to warm the inside of the vehicle when a heater switch not illustrated in the drawings is turned on.

The EGR cooler 30 is provided in the middle of the EGR flow path 100k and cools exhaust gas in the middle of the EGR flow path where a part of the exhaust gas exhausted from the engine 2 is circulated to an intake flow path of the engine 2. The transmission 32 is a so-called continuously variable transmission (CVT) and is provided in the middle of the transmission flow path 100l. The transmission 32 continuously varies transmission torque transmitted from the engine 2 and transmits the transmission torque to the wheels.

The water delivery pipe 34 is coupled to the water delivery flow path 100j, the EGR flow path 100k, and the bypass flow path 100m, and is also coupled to the transmission flow path 100l through the thermostat valve 36. The water delivery pipe 34 ejects the cooling water flowing in from the water delivery flow path 100j, the EGR flow path 100k, and the transmission flow path 100l to the bypass flow path 100m.

The thermostat valve 36 is coupled to the transmission flow path 100l and linked to the water delivery pipe 34. When the temperature of the cooling water in the water delivery pipe becomes higher than or equal to a predetermined first temperature threshold (for example, 50° C.), the thermostat valve 36 becomes an open state where the transmission flow path 100l and the water delivery pipe 34 are communicated with each other, and when the temperature of the cooling water in the water delivery pipe 34 is lower than the first temperature threshold, the thermostat valve 36 becomes a closed state where the transmission flow path 100l and the water delivery pipe 34 are disconnected from each other.

The purification catalyst 38 is provided to an exhaust pipe coupled to the engine 2 and purifies the exhaust gas ejected from the engine 2. The purification catalyst 38 is, for example, a three-way catalyst. The three-way catalyst contains catalyst components such as, for example, platinum (Pt), palladium (Pd), and rhodium (Rh). The purification catalyst 38 purifies hydrocarbon (HC), carbon monoxide (CO), and nitrogen oxide (NOx) (hereinafter, hydrocarbon, carbon monoxide, and nitrogen oxide may be collectively referred to as regulated substances) in the exhaust gas ejected from the engine 2.

On a circulation path of the cooling water, the purification catalyst 38 is coupled to the catalyst inflow flow path 100n and a catalyst inflow flow path 100o. The catalyst inflow flow path 100*n* is coupled to the second valve 22. The catalyst inflow flow path 100*o* is coupled to the third valve inflow flow path 100*g*.

The heating mechanism 40 heats the purification catalyst 38. The heating mechanism 40 is composed of, for example, an electric heater. The heating mechanism 40 is controlled by a heating controller 54 described later.

The refrigerant reservoir 42 is provided to the bypass flow path 100*m*. The refrigerant reservoir 42 stores the cooling water in a heat insulating manner. The refrigerant reservoir 42 is a container having a heat insulation structure.

The fourth valve 44 is an ON/OFF valve which is provided on the EGR flow path 100*k* and can switch between an open state where the EGR flow path 100*k* is opened and a closed state where the EGR flow path 100*k* is shut off.

The central controller 50 is composed of a semiconductor integrated circuit including a central processing unit (CPU), a ROM where a program and the like are stored, and a RAM used as a work area. The temperature sensors T1 to T6 are coupled to the central controller 50. The central controller 50 controls the water pump 10, the first valve 18, the second valve 22, the third valve 24, and the heating mechanism 40 based on signals transmitted from the temperature sensors T1 to T6 and an operation state of the engine 2 (the engine rotation number and an engine load). The central controller 50 derives the engine rotation number based on a signal indicating a crank angle transmitted from a crank angle sensor (not illustrated in the drawings) provided on a crank shaft of the engine 2 and derives an opening degree of a throttle (not illustrated in the drawings) as the engine load. The opening degree of the throttle is adjusted by an actuator corresponding to a stepping amount of an accelerator pedal, so that the amount of air supplied to the engine 2 is adjusted.

The temperature sensor T1 is provided on the pump discharge flow path 100*a* and measures the temperature of the cooling water discharged from the water pump 10. The temperature sensor T2 is provided inside the cylinder block 14 and measures the temperature of the cooling water that has circulated inside the cylinder block 14. The temperature sensor T3 is provided inside the cylinder head 16 and measures the temperature of the cooling water that has circulated inside the cylinder head 16. The temperature sensor T4 is provided on the second valve inflow flow path 100*f* and measures the temperature of the cooling water that has circulated in the engine 2. The temperature sensor T5 measures the temperature of cooling water stored in the refrigerant reservoir 42. The temperature sensor T6 measures the temperature of the purification catalyst 38.

Next, control processing performed by the central controller 50 will be described. Here, a relationship between a rotation angle of a rotary and opening rates in the third valve 24 will be described first, and then the control processing performed by the central controller 50 will be described.

Figure 2:
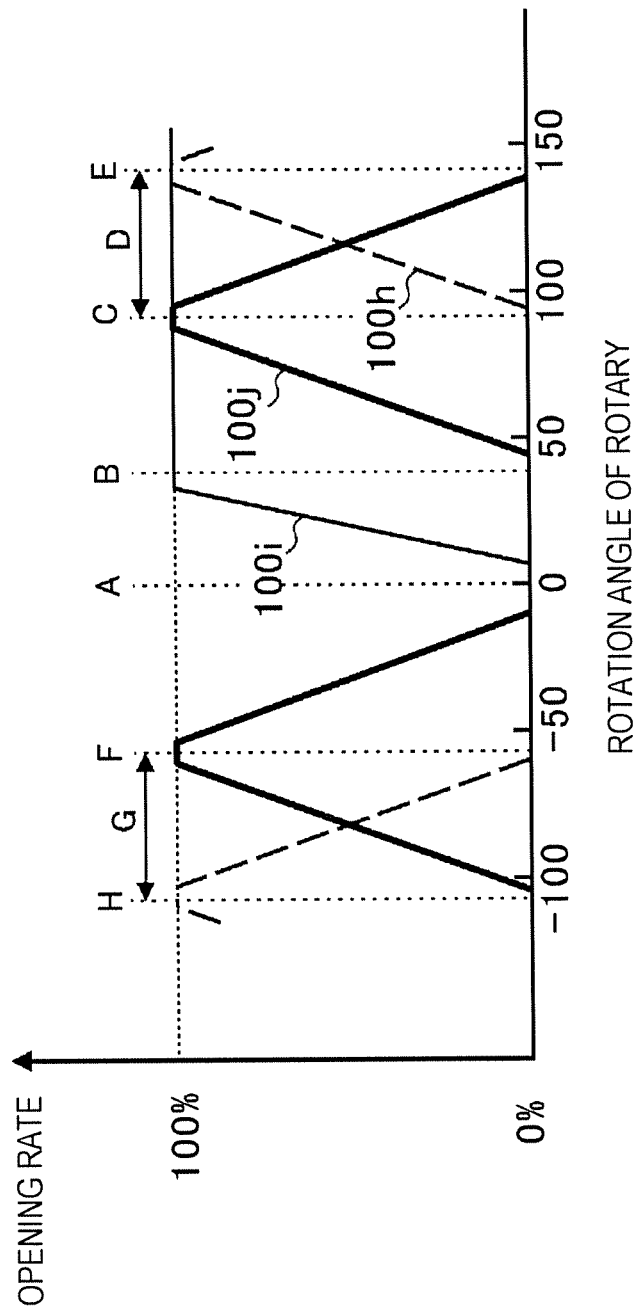
FIG. 2 is a diagram illustrating a relationship between a rotation angle of a rotary and opening rates in a third valve.

FIG. 2 is a diagram illustrating the relationship between the rotation angle of the rotary and the opening rates in the third valve 24. In FIG. 2, The opening rate with respect to the radiator flow path 100*h* is indicated by dashed lines, the opening rate with respect to the heater flow path 100*i* is indicated by thin lines (solid lines), and the opening rate with respect to the water delivery flow path 100*j* is indicated by thick lines (solid lines).

As illustrated in FIG. 2, in the third valve 24, the rotary can rotate in a positive direction and a negative direction from a state in which the rotation angle of the rotary is 0°. When the rotation angle of the rotary is 0° ("A" in FIG. 2), the opening rates of the third valve 24 with respect to the radiator flow path 100*h*, the heater flow path 100*i*, and the water delivery flow path 100*j* are 0%, so that the third valve 24 does not eject the cooling water to any of the radiator flow path 100*h*, the heater flow path 100*i*, and the water delivery flow path 100*j*.

When the rotary is rotated in the positive direction and the rotation angle becomes an angle indicated by "B" in FIG. 2, the opening rate of the third valve 24 with respect to the heater flow path 100*i* becomes 100% and the maximum flow rate of the cooling water is ejected only to the heater flow path 100*i*. When the rotary is further rotated in the positive direction and the rotation angle becomes an angle indicated by "C" in FIG. 2, the opening rates of the third valve 24 with respect to the heater flow path 100*i* and the water delivery flow path 100*j* become 100% and the cooling water is ejected to the heater flow path 100*i* and the water delivery flow path 100*j*. In other words, at the rotation angle indicated by "C" in FIG. 2, the cooling water does not flow into the radiator flow path 100*h* and the cooling water flows into the bypass flow path 100*m* through the water delivery flow path 100*j* and the water delivery pipe 34, so that it can be said that the bypass flow path 100*m* is a flow path that circulates the cooling water while bypassing the radiator 26.

When the rotary is further rotated from "C" in FIG. 2 in the positive direction, in a range "D" in FIG. 2, the opening rate of the third valve 24 with respect to the water delivery flow path 100*j* decreases from 100% to 0% and the opening rate of the third valve 24 with respect to the radiator flow path 100*h* increases from 0% to 100%. In the range "D" in FIG. 2, the opening rate of the third valve 24 with respect to the heater flow path 100*i* is maintained at 100% without change. Therefore, in the range "D" in FIG. 2, the third valve 24 ejects the cooling water to the heater flow path 100*i* and ejects the cooling water to the water delivery flow path 100*j* and the radiator flow path 100*h* at an intermediate opening degree (according to the opening rate). In other words, in the range "D" in FIG. 2, the third valve 24 can adjust the flow rate of the cooling water flowed to the radiator 26 and the bypass flow path 100*m* by the intermediate opening degree.

When the rotary is further rotated in the positive direction from the rotation angle in a range of "D" in FIG. 2 and the rotation angle becomes an angle indicated by "E" in FIG. 2, the opening rates of the third valve 24 with respect to the heater flow path 100*i* and the radiator flow path 100*h* become 100% and the cooling water is ejected to the heater flow path 100*i* and the radiator flow path 100*h*. In other words, at the rotation angle indicated by "E" in FIG. 2, the cooling water does not flow into the bypass flow path 100*m* and the cooling water flows into the radiator flow path 100*h* (the radiator 26), so that the largest amount of cooling water flows into the radiator 26.

On the other hand, when the rotary is rotated in the negative direction and the rotation angle becomes an angle indicated by "F" in FIG. 2, the opening rate of the third valve 24 with respect to the water delivery flow path 100*j* becomes 100% and the cooling water is ejected only to the water delivery flow path 100*j*.

When the rotary is further rotated from "F" in FIG. 2 in the negative direction, in a range "G" in FIG. 2, the opening rate of the third valve 24 with respect to the water delivery flow path 100*j* decreases from 100% to 0% and the opening rate of the third valve 24 with respect to the radiator flow path 100*h* increases from 0% to 100%. Therefore, in the range "G" in FIG. 2, the third valve 24 can adjust the flow rate of the cooling water flowed to the radiator 26 and the bypass flow path 100*m* by the intermediate opening degree.

When the rotary is further rotated in the negative direction from the rotation angle in a range of "G" in FIG. 2 and the rotation angle becomes an angle indicated by "H" in FIG. 2, the opening rate of the third valve 24 with respect to the radiator flow path 100h becomes 100% and the cooling water is ejected to the radiator flow path 100h.

In this way, the third valve 24 can adjust whether to eject the cooling water to the heater flow path 100i depending on whether the rotary is rotated in the positive direction or the negative direction. Even when the rotary is rotated in either the positive direction or the negative direction, the third valve 24 can adjust the opening rates with respect to the water delivery flow path 100j and the radiator flow path 100h by the rotation angle. In other words, the third valve 24 can adjust the flow rate of the cooling water to be flowed to the bypass flow path 100m and the radiator 26 by the rotation angle.

Subsequently, the control processing performed by the central controller 50 will be described. Let us return to FIG. 1. When the central controller 50 performs the control processing, the central controller 50 functions as a valve controller 52 and a heating controller 54.

The valve controller 52 controls open and closed states of the first valve 18 and controls the rotation angle of the rotary of the third valve 24 based on the temperature of the cooling water measured be the temperature sensors T1 to T4, the engine rotation number, and the engine load. In this case, the valve controller 52 controls the second valve 22 into a first state (a state where the second valve inflow flow path 100f and the third valve inflow flow path 100g are communicated with each other and the second valve inflow flow path 100f and the catalyst inflow flow path 100n are disconnected from each other) and controls the fourth valve 44 into an open state.

When the temperature (hereinafter referred to as block temperature) of the cooling water that has flowed through the cylinder block 14, which is measured by the temperature sensor T2, is lower than a predetermined second temperature threshold (for example, 110° C.), the valve controller 52 controls the first valve 18 into the closed state and does not let the cooling water flow through the cylinder block 14. When the block temperature is higher than or equal to the second temperature threshold (for example, 110° C.), the valve controller 52 controls the first valve 18 into the open state and lets the cooling water flow through the cylinder block 14.

The valve controller 52 acquires one of a plurality of target temperature maps based on head temperature measured by the temperature sensor T3, and sets a target temperature of the cooling water that has flowed through the cylinder head 16 by referring to the acquired target temperature map based on the engine rotation number and the engine load. In the plurality of target temperature maps, the target temperature is associated with the engine rotation number and the engine load and it is set so that the higher the engine load, the lower the target temperature. The target temperature maps are stored in the ROM.

When the valve controller 52 sets the target temperature, the valve controller 52 determines the rotation angle of the rotary of the third valve 24 according to on/off of the heater switch and the set target temperature and controls the third valve 24 (rotary) into one of states of "A" to "H" in FIG. 2 so that the rotary has the determined rotation angle. Here, the valve controller 52 performs control so that the higher the set target temperature, the more the third valve 24 is rotated in the positive direction or in the negative direction. In other words, the valve controller 52 performs control to raise the temperature of the cooling water by letting less cooling water flow through the radiator 26 as the target temperature rises and performs control to lower the temperature of the cooling water by letting more cooling water flow through the radiator 26 as the target temperature lowers.

The valve controller 52 corrects the rotation angle of the rotary of the third valve 24 based on a temperature difference between the target temperature and the head temperature. For example, when the temperature difference obtained by subtracting the head temperature from the target temperature is greater than 0, the valve controller 52 performs correction so that the rotation angle of the rotary approaches 0° as the temperature difference increases. In other words, when the head temperature is lower than the target temperature, the valve controller 52 performs control so as to raise the temperature of the cooling water by not letting the cooling water flow through the radiator 26.

When the temperature difference obtained by subtracting the head temperature from the target temperature is smaller than 0, the valve controller 52 performs correction so that the rotation angle of the rotary goes away from 0° as the temperature difference decreases. In other words, when the head temperature is higher than the target temperature, the valve controller 52 performs control so as to lower the temperature of the cooling water by letting the cooling water flow through the radiator 26.

The valve controller 52 corrects the rotation angle of the rotary of the third valve 24 based on the temperature (hereinafter also referred to as pump temperature) of the cooling water discharged from the water pump 10, which is measured by the temperature sensor T1, and water temperature (hereinafter also referred to as engine temperature) of the cooling water that has circulated in the engine 2, which is measured by the temperature sensor T4. Here, when the engine rotation number and the engine load rapidly change and target water temperature changes, the valve controller 52 corrects the rotation angle of the rotary of the third valve 24 so that a response delay of the water temperature is reduced.

The heating controller 54 starts driving of the heating mechanism 40 at a predetermined start timing before the engine 2 is started. The start timing is, for example, a timing when detecting unlocking of a driver's seat door of the vehicle 1, a timing when a weight sensor of a driver's seat of the vehicle 1 detects a predetermined weight (a weight indicating that a person sits on the driver's seat), a timing when a camera installed in the vehicle 1 detects a person on the driver's seat, and a timing when detecting a smart key within a predetermined range from the vehicle 1. Furthermore, the heating controller 54 may learn a starting time of the engine 2 every day and derive an estimated time of the starting time of the engine 2, and the heating controller 54 may determine a time a predetermined time (for example, 10 minutes) before the estimated time as the start timing.

When the engine 2 is being stopped and a predetermined end timing is reached, the heating controller 54 stops the heating mechanism 40. The end timing is, for example, a timing when detecting locking of the driver's seat door of the vehicle 1, a timing when a voltage of the battery becomes lower than a predetermined value, and a timing when a predetermined time elapses from when the driving of the heating mechanism 40 is started. When the engine 2 is started (for example, at a timing when a starter not illustrated in the drawings is energized), the heating controller 54 stops the heating mechanism 40.

Before the engine 2 is started, the valve controller 52 controls open and closed states of the first valve 18 and the fourth valve 44 and controls a switching state of the second valve 22 and the rotation angle of the rotary of the third valve 24 based on a driving state of the heating mechanism 40.

Subsequently, a flow of the cooling water flowing through the cooling flow paths 100 according to open and closed states of the first valve 18, the third valve 24, and the thermostat valve 36 when the engine 2 is driven will be described with reference to specific examples. As described above, the valve controller 52 controls the rotation angle of the rotary of the third valve 24 based mainly on the engine rotation number and the engine load. However, here, for ease of understanding, the flow of the cooling water will be described based on the water temperature of the cooling water.

FIGS. 3 to 8 are diagrams for explaining the flow of the cooling water when the heater 28 is off. In FIGS. 3 to 8, solid arrows indicate the cooling flow paths 100 (100*a* to 100*o*) through which the cooling water flows, dashed arrows indicate the cooling flow paths 100 (100*a* to 100*o*) through which the cooling water does not flow, and dashed-dotted arrows indicate the cooling flow paths 100 (100*a* to 100*o*) where the flow of the cooling water is controlled by the intermediate opening degree.

Figure 3:
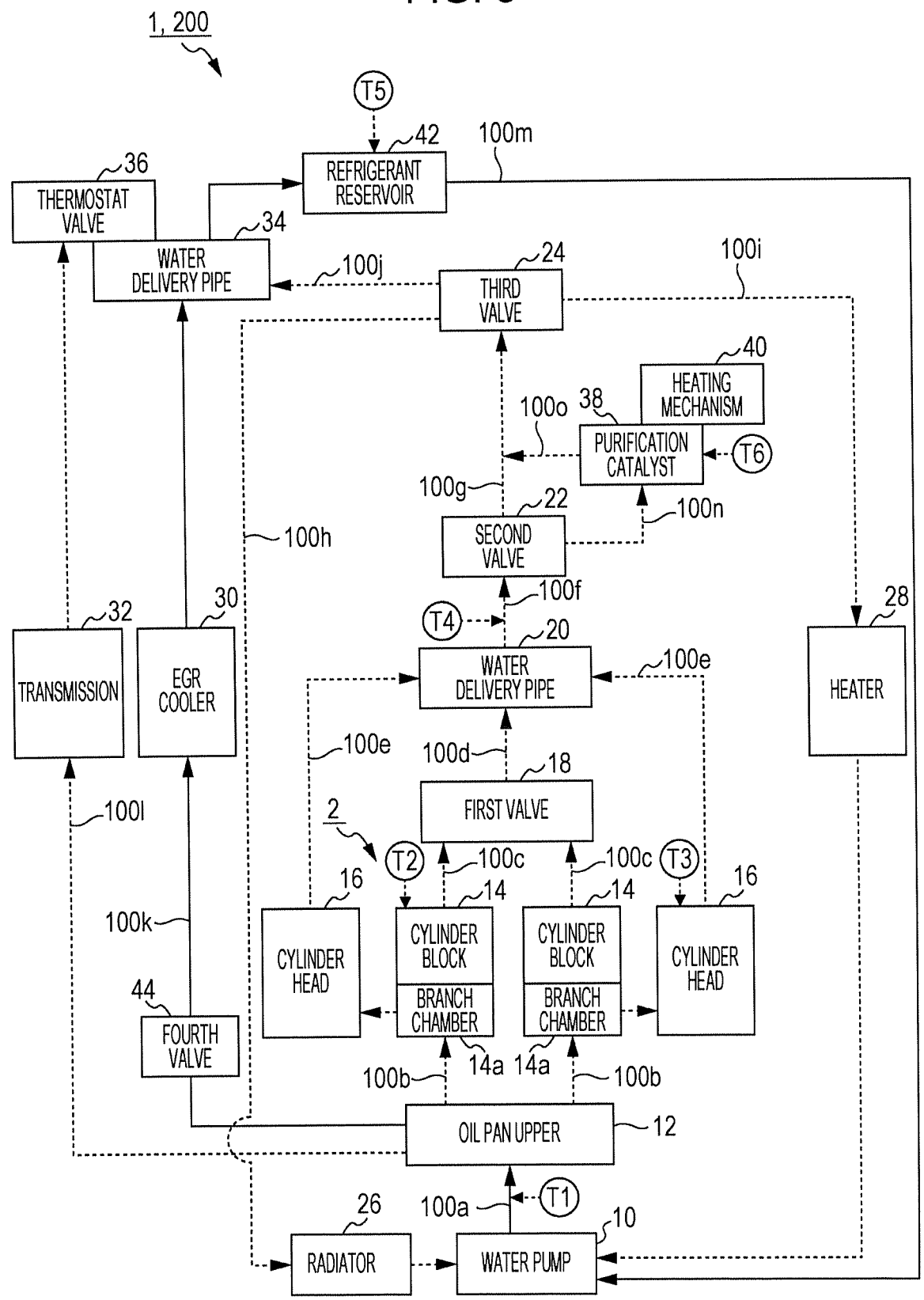
FIG. 3 is a first diagram for explaining a flow of cooling water when a heater is off.

As illustrated on FIG. 3, when the cooling water in the refrigerant reservoir 42 is not warmed and its temperature is nearly the same as the outside air temperature such as when the engine 2 is started up, the third valve 24 is maintained at the rotation angle indicated by "A" in FIG. 2, the fourth valve 44 is in an open state, and the first valve 18 and the thermostat valve 36 are in the closed state. The second valve 22 is in a state (first state) where the second valve inflow flow path 100*f* and the third valve inflow flow path 100*g* are communicated with each other and the second valve inflow flow path 100*f* and the catalyst inflow flow path 100*n* are disconnected from each other. In this case, in the vehicle 1, the first valve 18 is in the closed state and the opening rate of the third valve 24 with respect to any of the flow paths is 0%, so that the cooling water discharged from the water pump 10 flows to only the EGR flow path 100*k* through the oil pan upper 12. The cooling water flowed to the water delivery pipe 34 is returned to the water pump 10 through the bypass flow path 100*m*.

In this way, when the temperature of the cooling water stored in the refrigerant reservoir 42 is nearly the same as the outside air temperature, the temperature of the cooling water in the engine 2 and the transmission 32 is quickly raised and the temperature of oil in the engine 2 is also raised by limiting the cooling flow paths 100 through which the cooling water flows, so that oil friction is quickly reduced.

Figure 4:
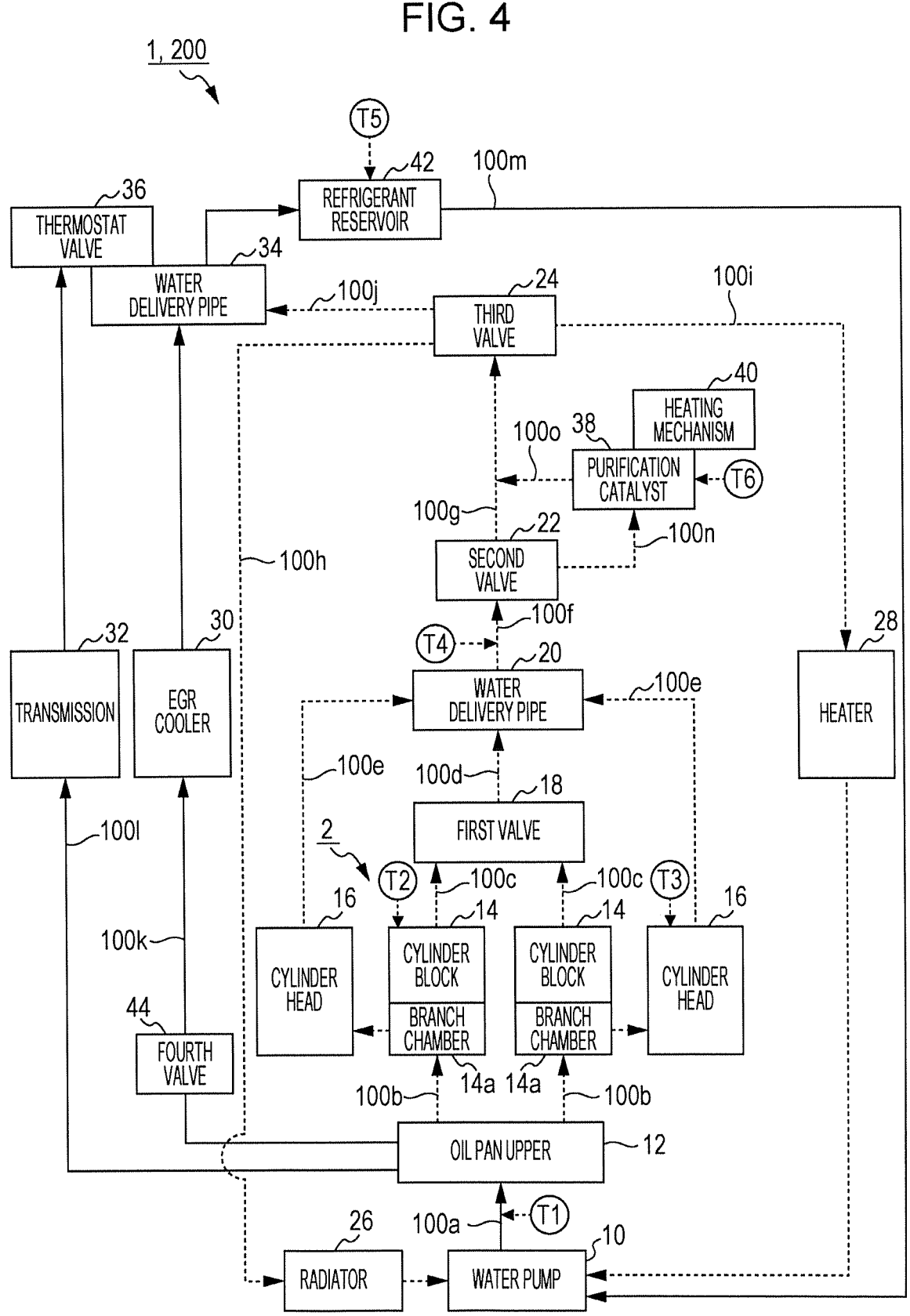
FIG. 4 is a second diagram for explaining the flow of cooling water when the heater is off.

When the temperature of the cooling water in the water delivery pipe 34 becomes higher than or equal to the predetermined first temperature threshold (for example, 50° C.), in the vehicle 1, as illustrated in FIG. 4, the thermostat valve 36 becomes an open state and the cooling water also flows through the transmission flow path 100*l*, so that it is possible to raise the temperature of oil in the transmission 32 and quickly reduce the oil friction.

Figure 5:
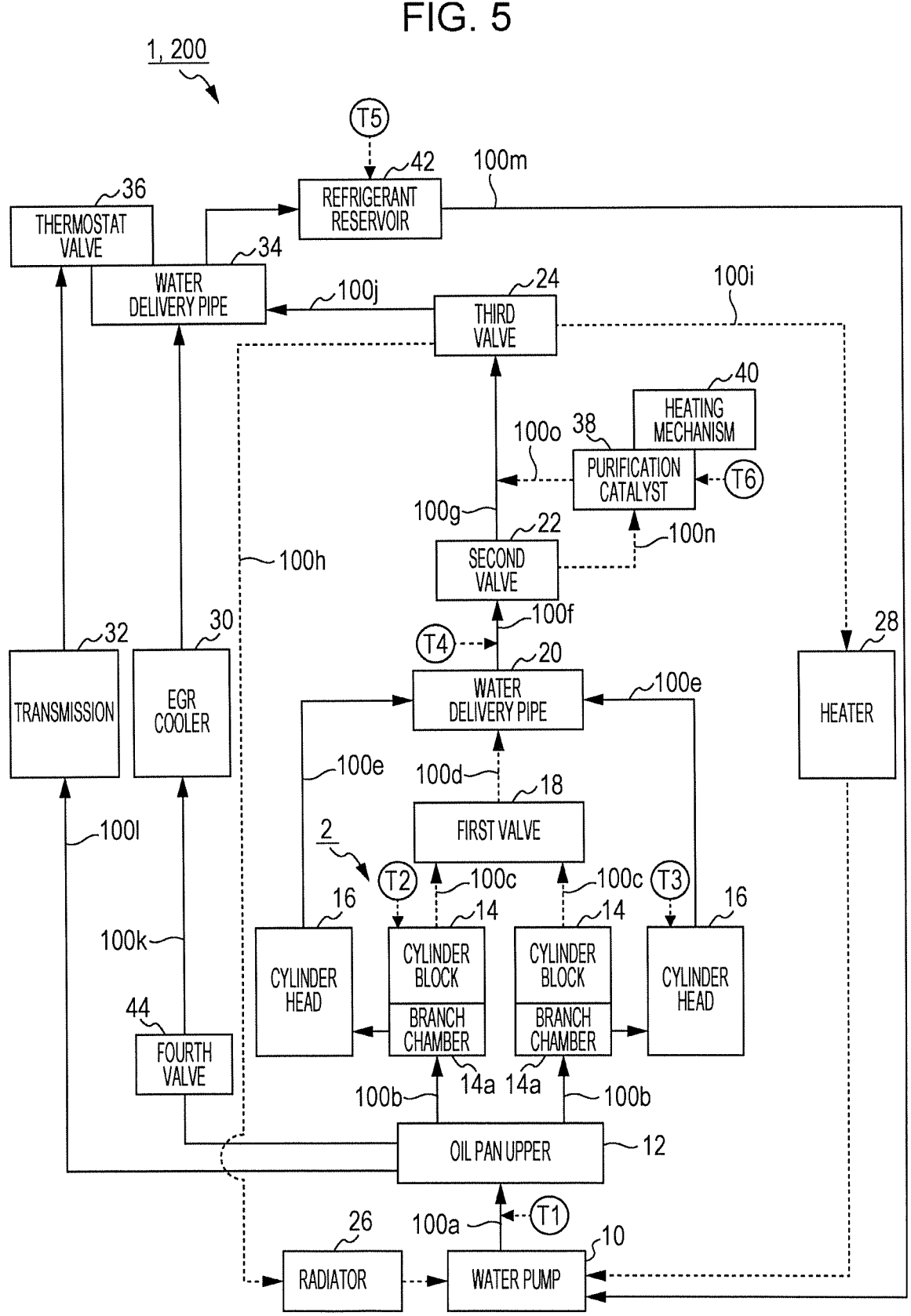
FIG. 5 is a third diagram for explaining the flow of cooling water when the heater is off.

When the head temperature rises and the third valve 24 is maintained at the rotation angle indicated by "F" in FIG. 2 and further the opening rate of the third valve 24 with respect to the water delivery flow path 100*j* becomes 100%, in the vehicle 1, as illustrated in FIG. 5, the cooling water begins to flow from the third valve 24 to the water delivery pipe 34. Then, the cooling water begins to flow from the oil pan upper 12 to the cylinder head 16 through the branch chamber 14*a*. Thereby, the cylinder head 16 is cooled by the cooling water. Here, the cylinder head 16 receives more heat than the cylinder block 14 and heat capacity of the cylinder head 16 is small, so that the temperature of the cylinder head 16 easily rises. Therefore, the cooling water is first flowed through the cylinder head 16 independently from the cylinder block 14.

Figure 6:
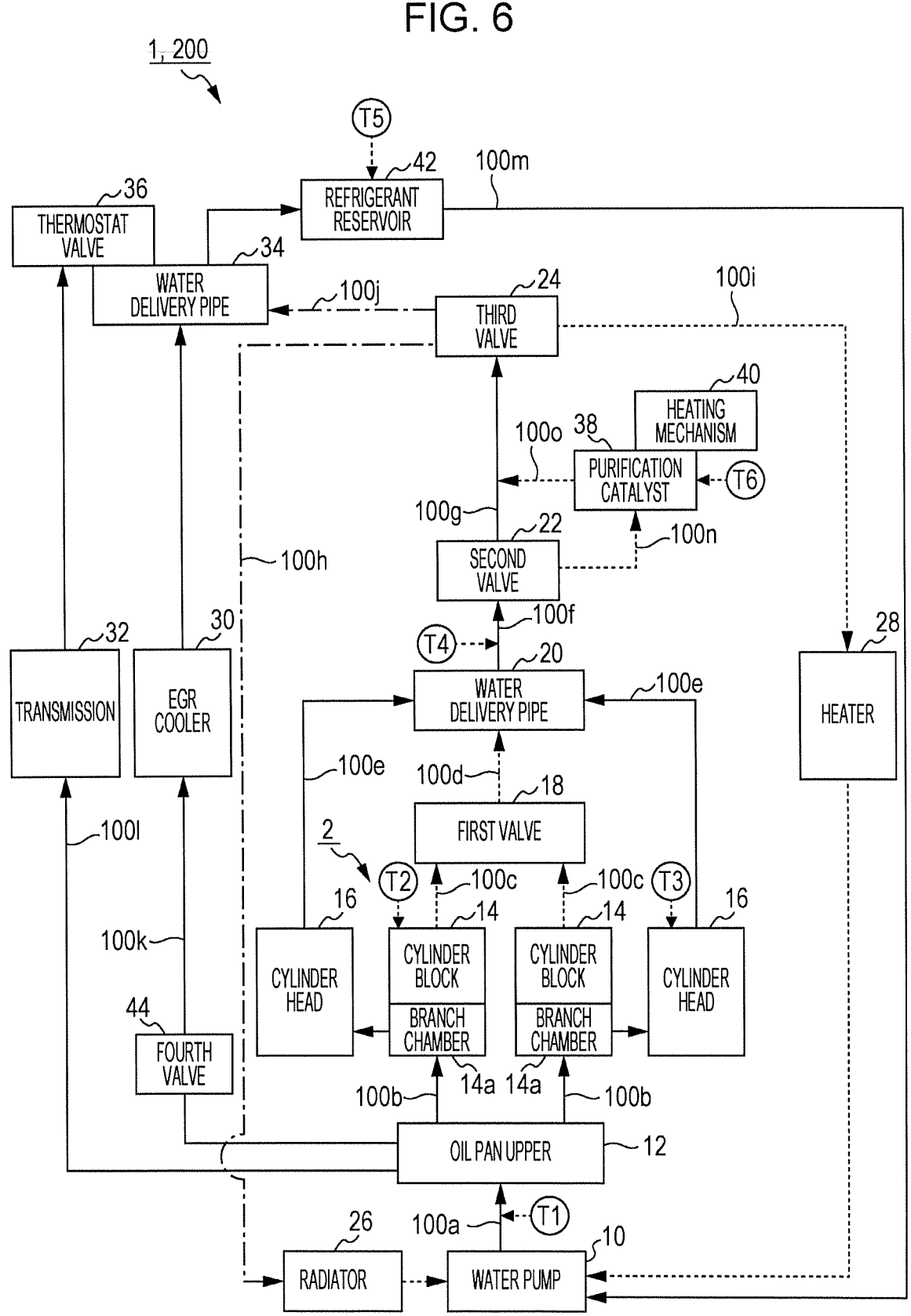
FIG. 6 is a fourth diagram for explaining the flow of cooling water when the heater is off.

Thereafter, when the water temperature of the cooling water further rises and the third valve 24 is controlled in a region of "G" in FIG. 2 and further the opening rates of the third valve 24 with respect to the water delivery flow path 100*j* and the radiator flow path 100*h* become the intermediate opening degree, in the vehicle 1, as illustrated in FIG. 6, a part of the cooling water that has flowed through the cylinder head 16 begins to flow through the radiator 26. When the cooling water begins to flow through the radiator 26, the cooling water begins to be cooled by the radiator 26. At this time, the flow rate of the cooling water flowing into the radiator 26 is adjusted by the opening rates with respect to the water delivery flow path 100*j* and the radiator flow path 100*h*, so that a cooling amount of the cooling water is also adjusted.

Figure 7:
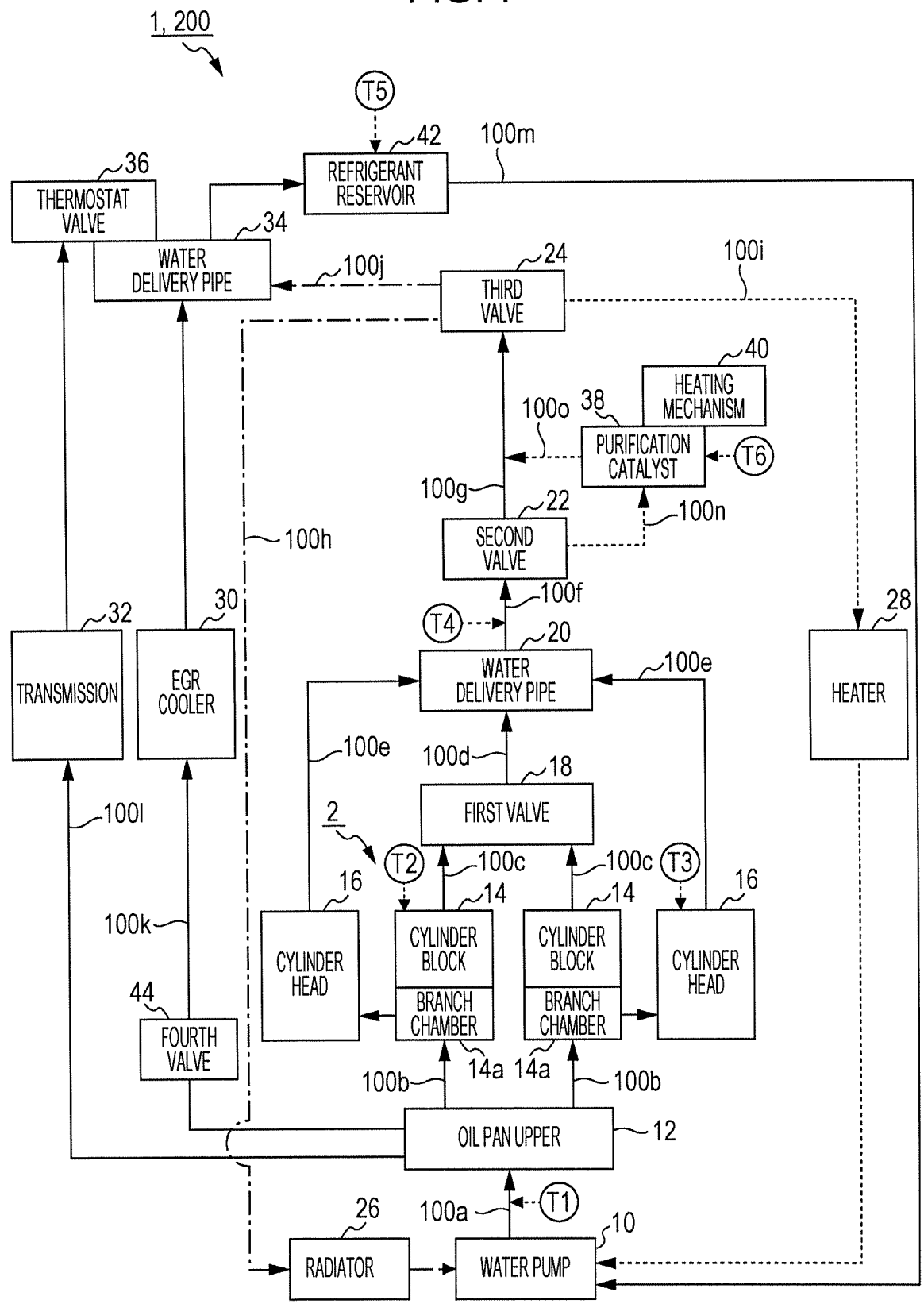
FIG. 7 is a fifth diagram for explaining the flow of cooling water when the heater is off.

When the block temperature becomes higher than or equal to the second temperature threshold, the first valve 18 becomes the open state, and in the vehicle 1, as illustrated in FIG. 7, the cooling water also begins to flow through the cylinder block 14. When the cooling water flows through the cylinder block 14, the cylinder block 14 is cooled by the cooling water and is maintained at an appropriate temperature.

Figure 8:
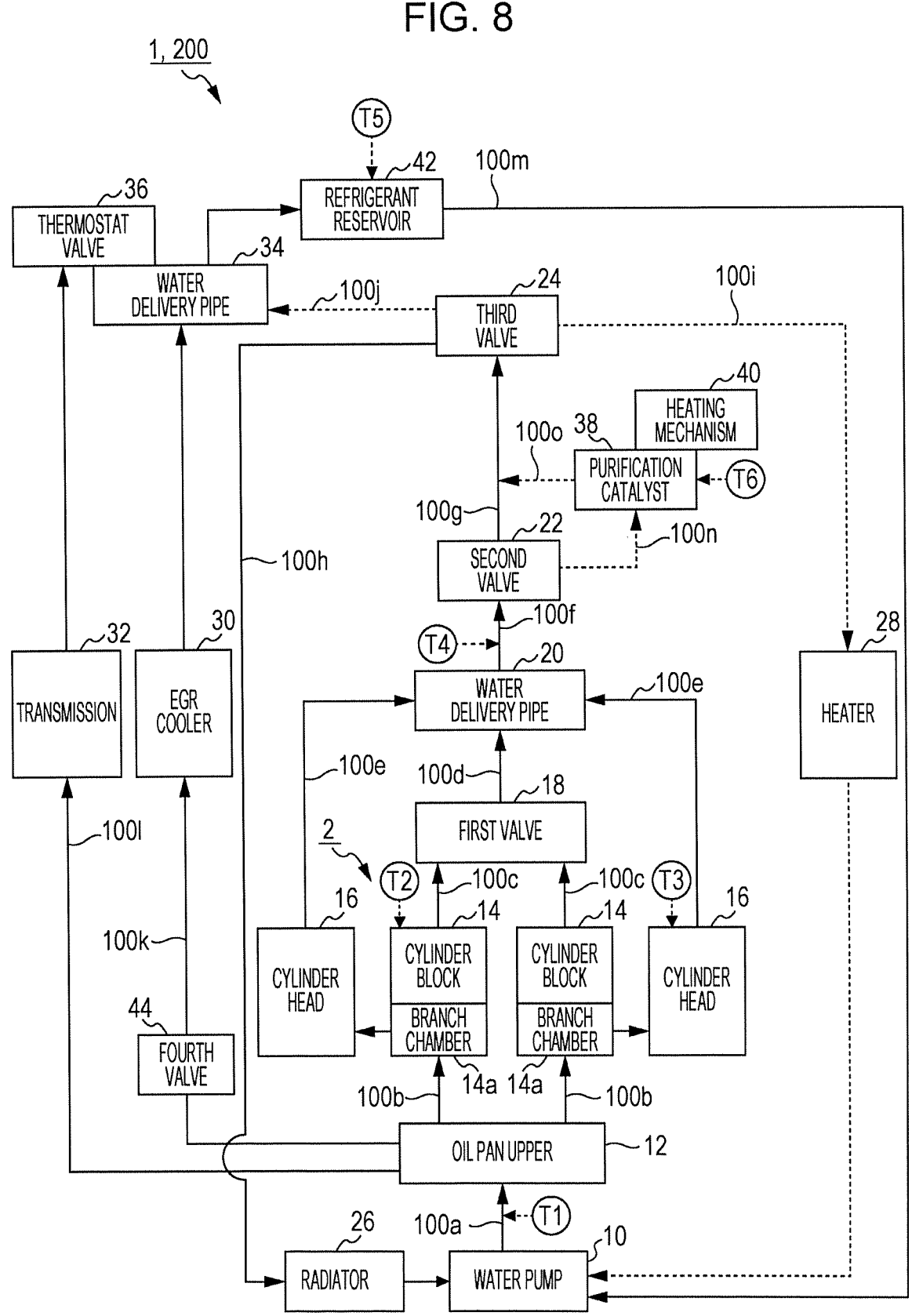
FIG. 8 is a sixth diagram for explaining the flow of cooling water when the heater is off.

In a situation where the engine load increases and the cooling water can be most easily warmed, the third valve 24 is maintained at the rotation angle indicated by "H" in FIG. 2 and the opening rate of the third valve 24 with respect to the radiator flow path 100*h* becomes 100%. In this case, in the vehicle 1, as illustrated in FIG. 8, most of the cooling water that has flowed through the engine 2 flows into the radiator 26, so that the cooling water is cooled.

FIGS. 9 to 13 are diagram for explaining the flow of the cooling water when the heater 28 is on. In FIGS. 9 to 13, solid arrows indicate the cooling flow paths 100 through which the cooling water flows, dashed arrows indicate the cooling flow paths 100 through which the cooling water does not flow, and dashed-dotted arrows indicate the cooling flow paths 100 where the flow of the cooling water is controlled by the intermediate opening degree.

When the cooling water in the refrigerant reservoir 42 is not warmed and its temperature is nearly the same as the outside air temperature such as when the engine 2 is started up, even if the heater 28 is on, the third valve 24 is maintained at the rotation angle indicated by "A" in FIG. 2 and the first valve 18 and the thermostat valve 36 are in the closed state. The second valve 22 is in a state (the first state) where the second valve inflow flow path 100*f* and the third valve inflow flow path 100*g* are communicated with each other and the second valve inflow flow path 100*f* and the catalyst inflow flow path 100*n* are disconnected from each other. In this case, in the vehicle 1, in the same manner as when the heater 28 is off as illustrated in FIGS. 3 and 4, the cooling water does not flow through the heater 28.

Figure 9:
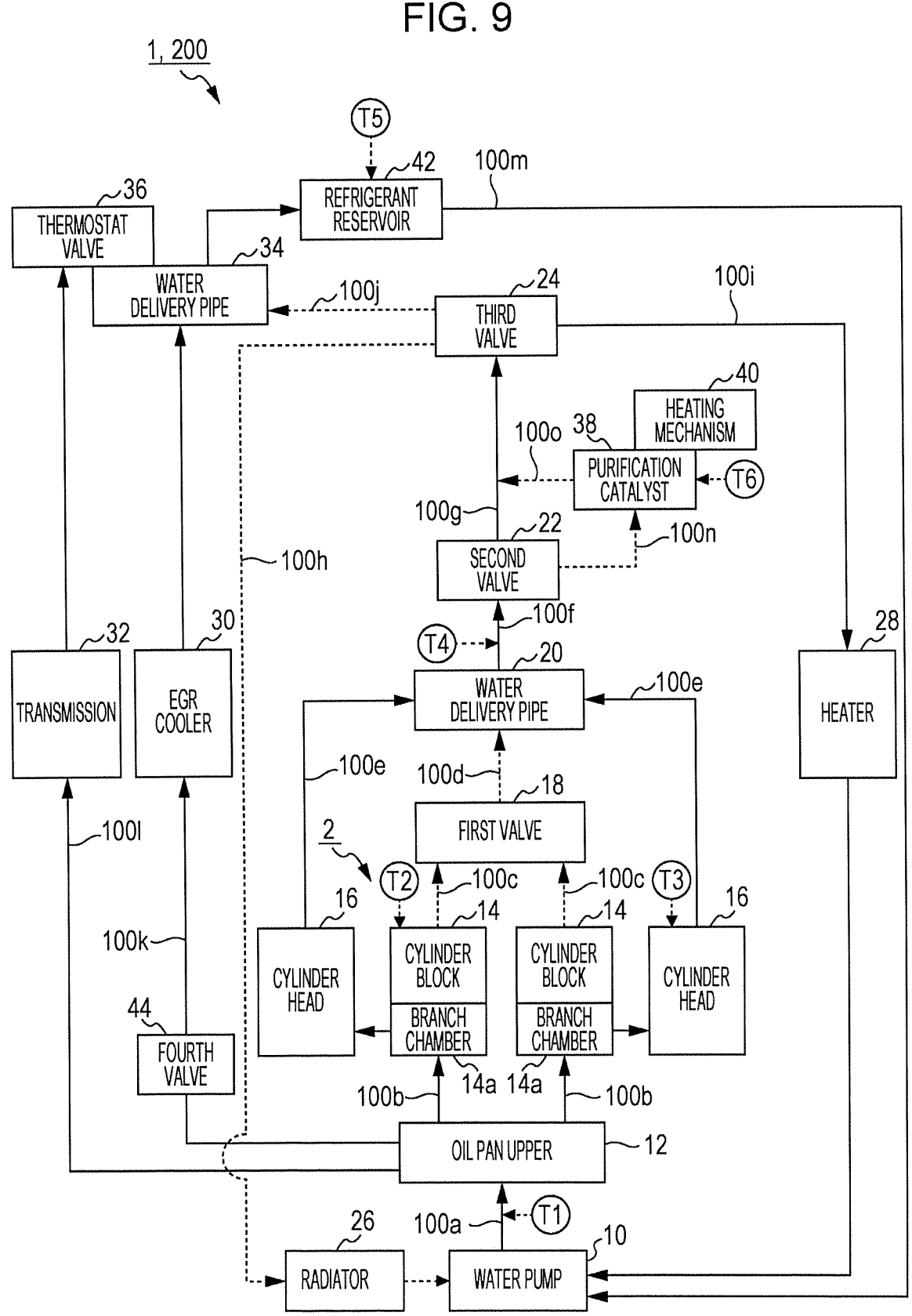

Thereafter, when the head temperature rises to, for example, 50° C., the third valve 24 is maintained at the rotation angle indicated by "B" in FIG. 2 and the opening rate of the third valve 24 with respect to the heater flow path 100*i* becomes 100%. In this case, in the vehicle 1, as illustrated in FIG. 9, the cooling water begins to flow from the third valve 24 to the heater flow path 100*i*. Then, the heater 28 can release the heat of the cooling water to the inside of the vehicle and warm the inside of the vehicle.

Figure 10:
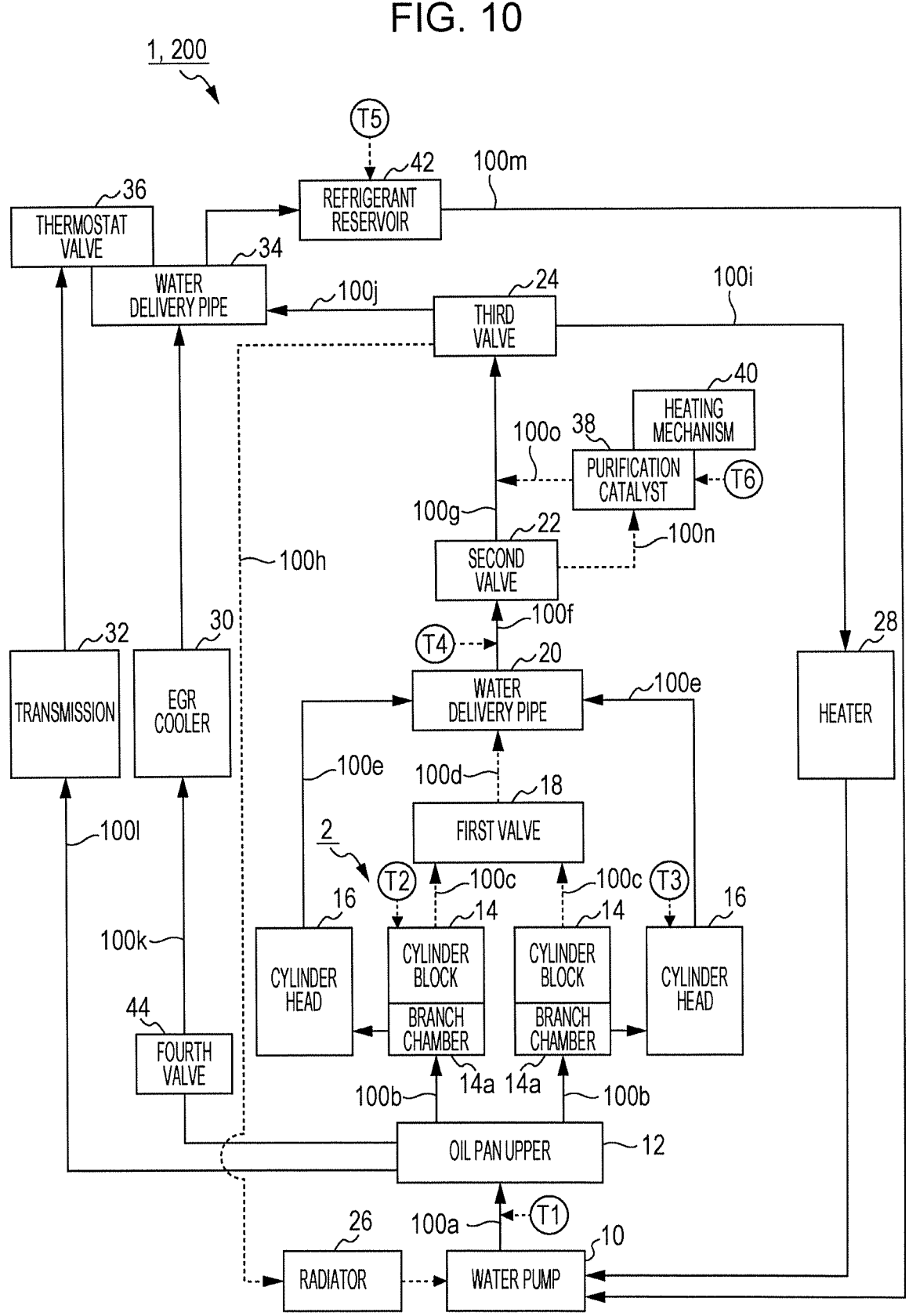

Thereafter, when the head temperature rises, the third valve 24 is maintained at the rotation angle indicated by "C" in FIG. 2 and the opening rates of the third valve 24 with respect to the water delivery pipe 34 and the heater flow path 100$i$ become 100%. In this case, in the vehicle 1, as illustrated in FIG. 10, the cooling water begins to flow from the third valve 24 to the water delivery pipe 34 and the heater flow path 100$i$.

Figure 11:
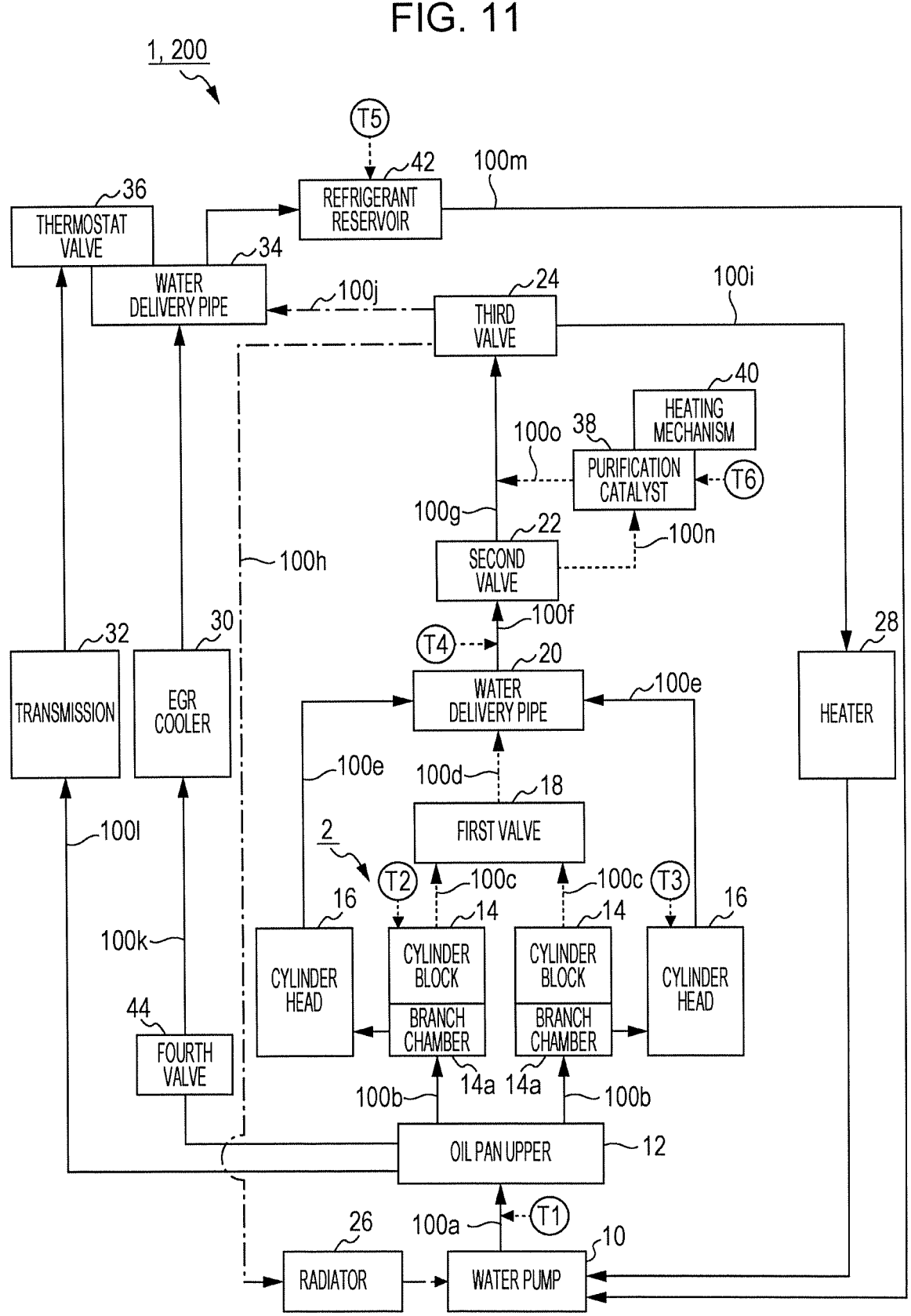

Thereafter, when the water temperature of the cooling water further rises, the rotation angle of the third valve 24 is controlled in a region of "D" in FIG. 2, the opening rates of the third valve 24 with respect to the water delivery flow path 100$j$ and the radiator flow path 100$h$ become an intermediate opening degree, and the opening rate of the third valve 24 with respect to the heater flow path 100$i$ becomes 100%. In this case, in the vehicle 1, as illustrated in FIG. 11, the cooling water flows into the heater flow path 100$i$ and a part of the cooling water that has flowed through the cylinder head 16 begins to flow through the radiator 26.

Figure 12:
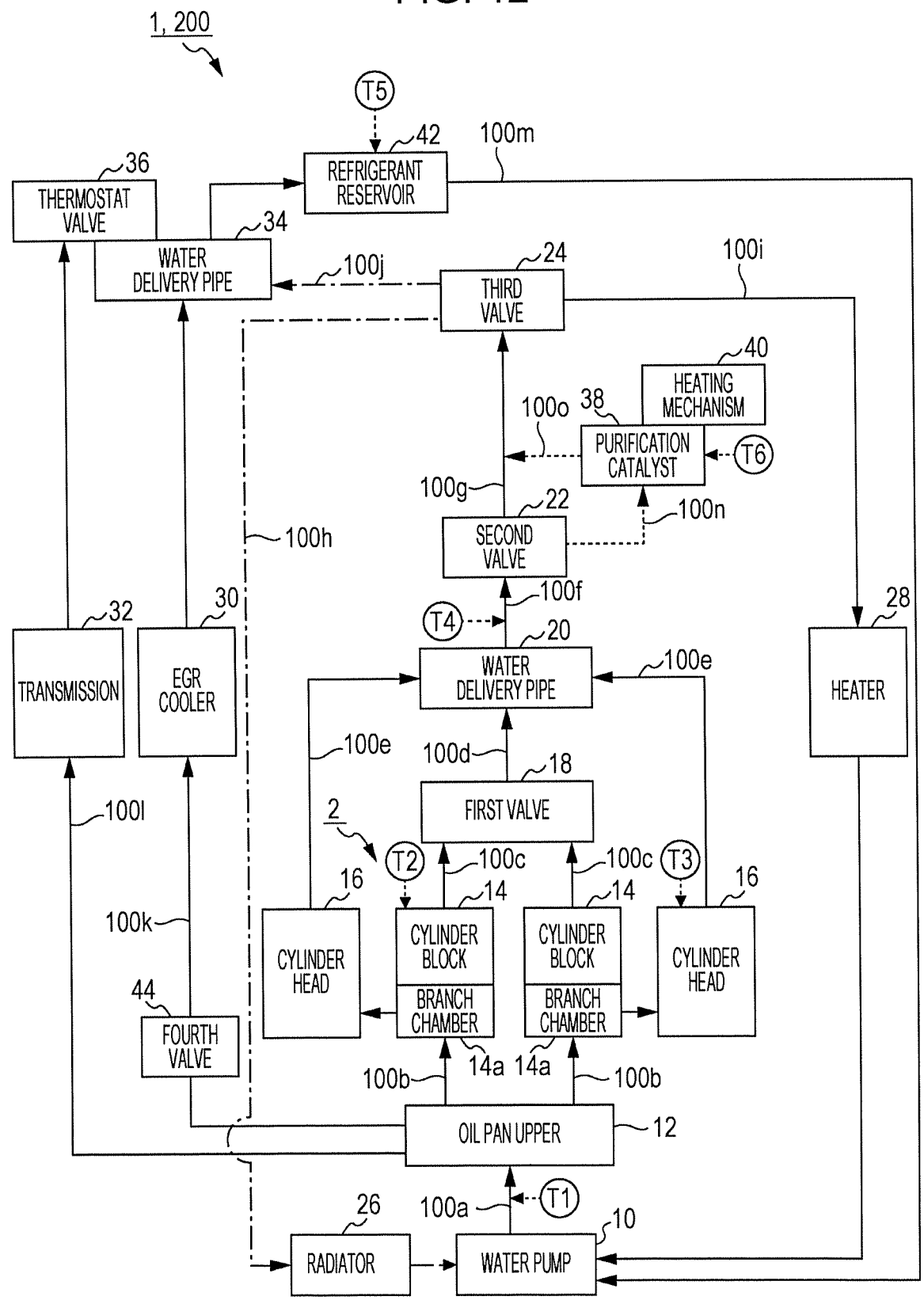

When the block temperature becomes higher than or equal to the second temperature threshold and the first valve 18 becomes the open state, as illustrated in FIG. 12, the cooling water also begins to flow through the cylinder block 14. In this case, in the vehicle 1, when the cooling water flows through the cylinder block 14, the cylinder block 14 is cooled and maintained at an appropriate temperature.

Figure 13:
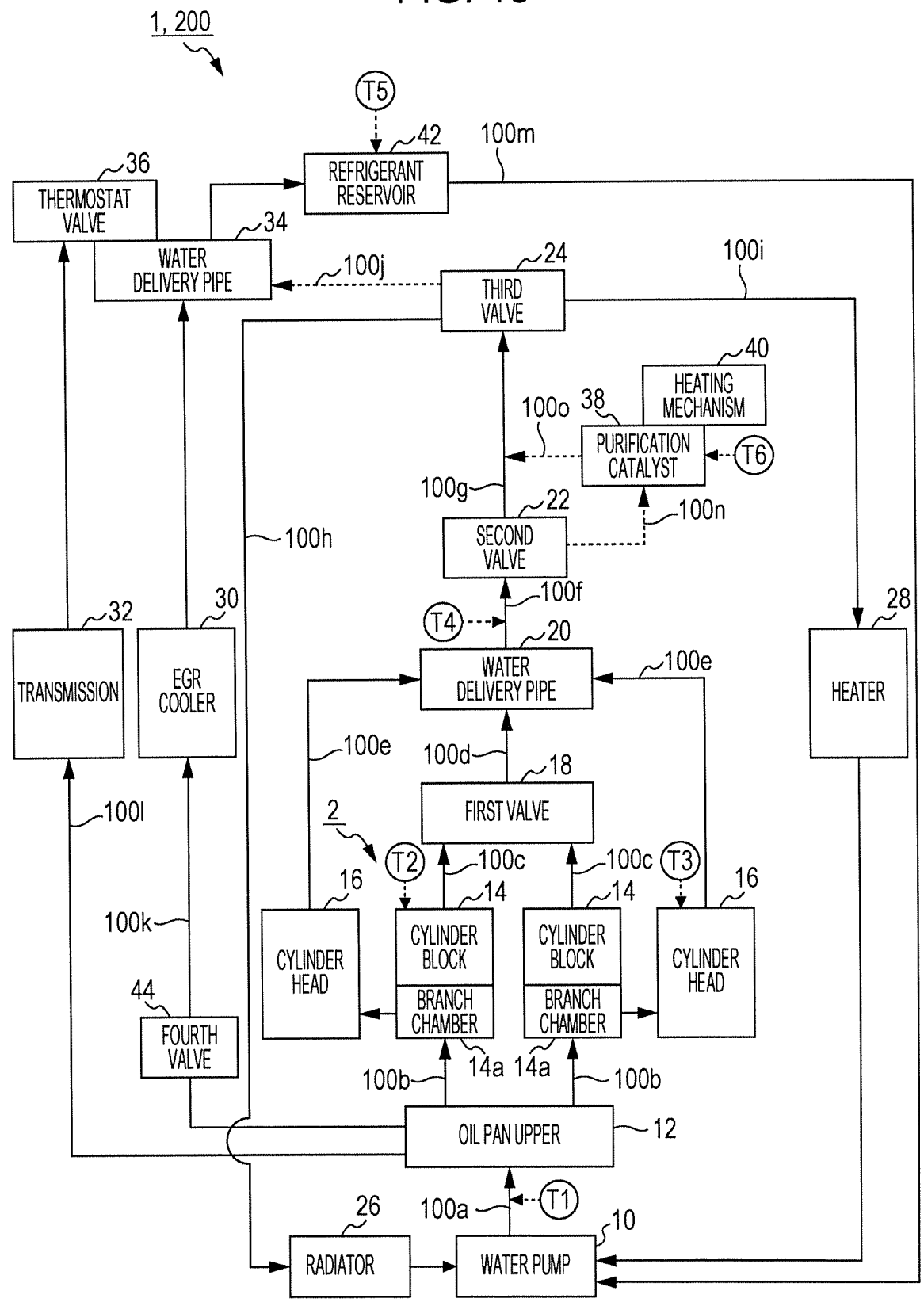

In a situation where the engine load increases and the cooling water can be most easily warmed, the third valve 24 is maintained at the rotation angle indicated by "E" in FIG. 2 and the opening rates of the third valve 24 with respect to the radiator flow path 100$h$ and the heater flow path 100$i$ become 100%. In this case, in the vehicle 1, as illustrated in FIG. 13, the cooling water that has flowed through the engine 2 flows into the heater flow path 100$i$ and the radiator 26, so that the cooling water is cooled.

In this way, in the vehicle 1, the cooling water can flow through the cylinder block 14 and the cylinder head 16 independently from each other, and whether to flow the cooling water through the cylinder block 14 is controlled by the first valve 18. The vehicle 1 is provided with the third valve 24 to which the cooling water that has flowed through the engine 2 (the cylinder blocks 14 and the cylinder heads 16) is flowed and which controls inflow of the cooling water to the radiator flow path 100$h$ and the bypass flow path 100$m$ at an intermediate opening degree.

Therefore, the vehicle 1 can flow the cooling water to the cylinder head 16 by flowing the cooling water to at least one of the radiator flow path 100$h$ or the bypass flow path 100$m$ by controlling the third valve 24. Furthermore, the vehicle 1 can adjust the cooling amount of the cooling water by adjusting the opening rate with respect to radiator flow path 100$h$ by controlling the third valve 24. Thus, the vehicle 1 can control rising and lowering of the temperature of the cooling water in an early stage according to an operation state of the engine 2, so that it is possible to efficiently warm and cool each component of the vehicle 1 (the cylinder block 14, the cylinder head 16, the EGR cooler 30, the heater 28, the transmission 32, and the like).

The cooling water flows through the transmission 32 independently from the engine 2, and when the water temperature of the cooling water in the water delivery pipe 34 becomes higher than or equal to the first temperature threshold, the cooling water flows through the transmission 32, so that it is possible to warm and cool the transmission 32 independently from the engine 2.

Subsequently, switching positions of the second valve 22 before the engine 2 is started and a flow of the cooling water flowing through the cooling flow paths 100 according to on/off of the water pump 10 will be described with reference to specific examples.

Figure 14:
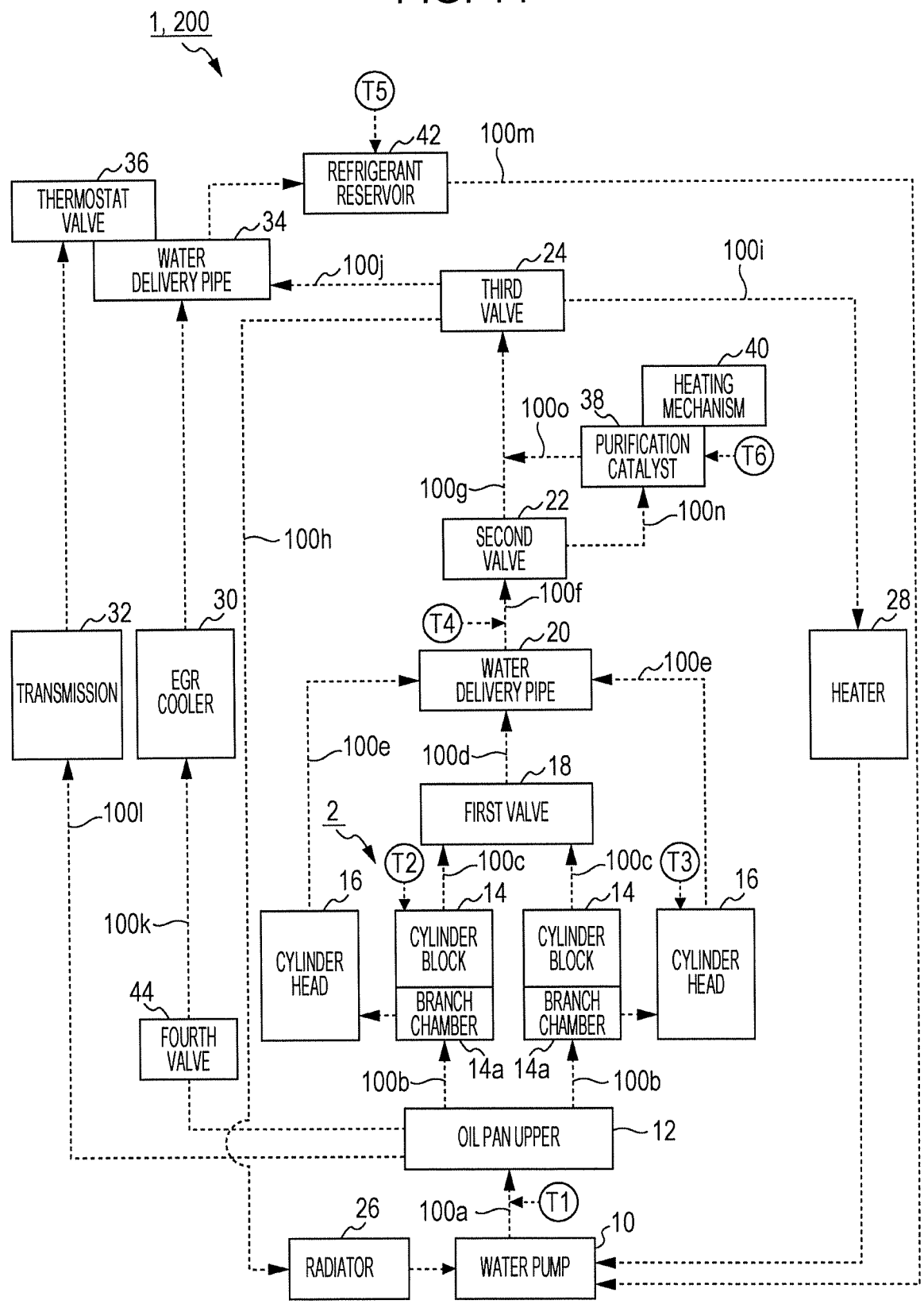
FIG. 14 is a first diagram for explaining a flow of cooling water before an engine is started.
Figure 15:
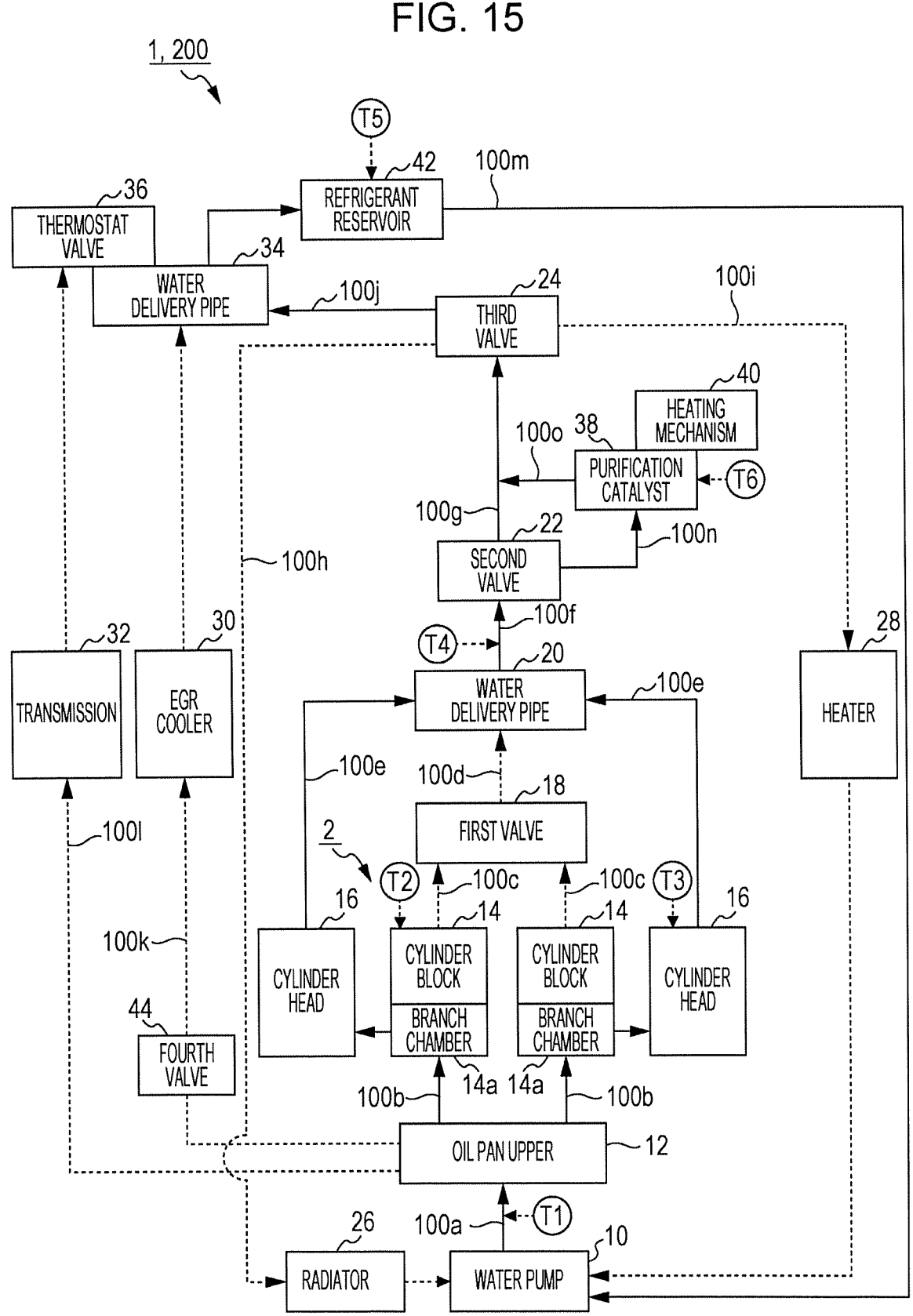
FIG. 15 is a second diagram for explaining the flow of cooling water before the engine is started.
Figure 16:
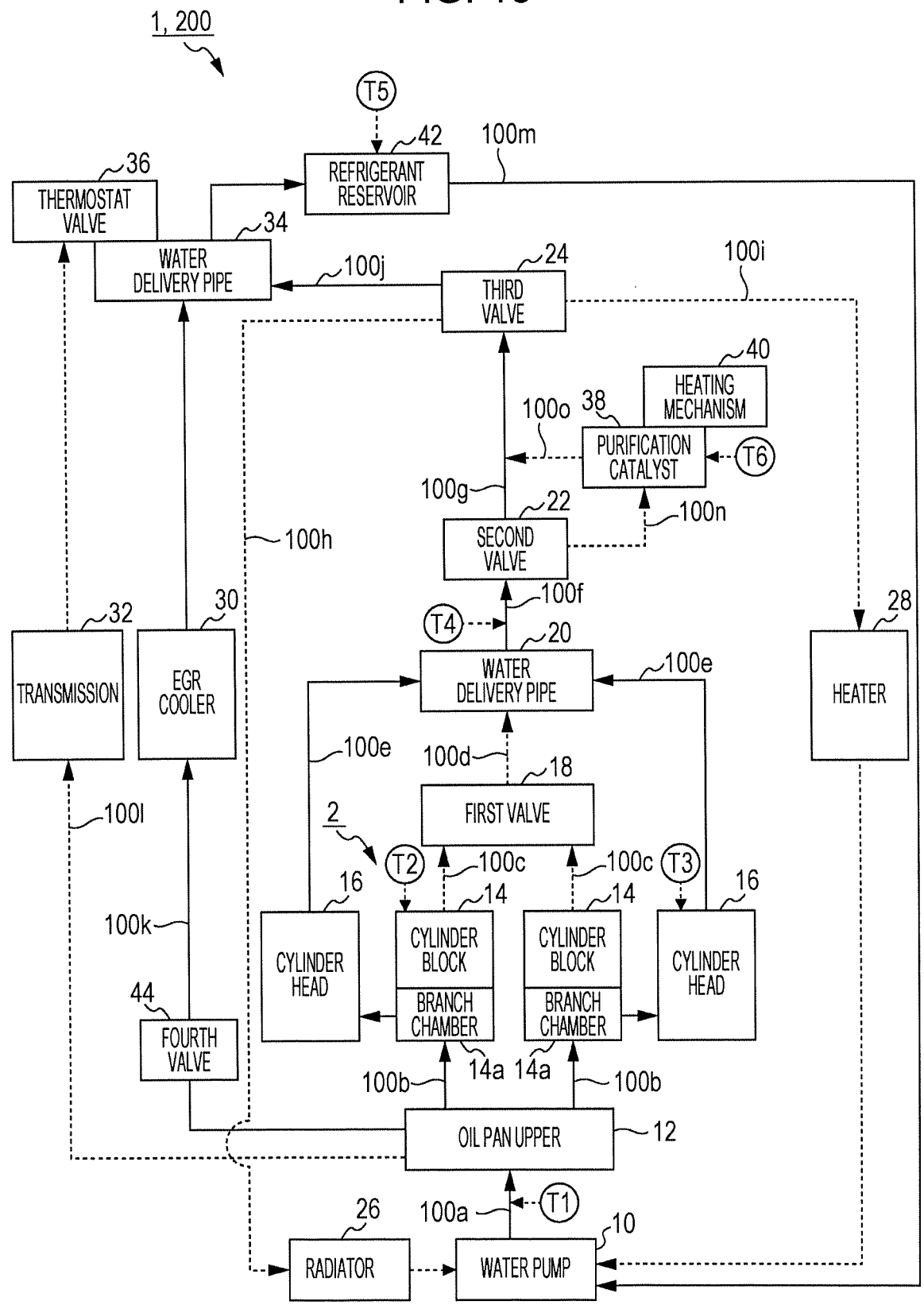
FIG. 16 is a third diagram for explaining the flow of cooling water before the engine is started.

FIGS. 14 to 16 are diagrams for explaining the flow of cooling water before the engine 2 is started. In FIGS. 14 to 16, solid arrows indicate the cooling flow paths 100 (100$a$ to 100$o$) through which the cooling water flows, and dashed arrows indicate the cooling flow paths 100 (100$a$ to 100$o$) through which the cooling water does not flow.

When the heating mechanism 40 is driven before the engine 2 is started, as illustrated in FIG. 14, the valve controller 52 controls the first valve 18 and the fourth valve 44 into the closed state and does not start driving of the water pump 10 (maintains a stopped state). Thereby, the cooling water does not flow around the purification catalyst 38, so that it is possible to suppress transfer of heat of the heating mechanism (or heat of the purification catalyst 38 heated by the heating mechanism 40) to the cooling water. In other words, it is possible to suppress a situation in which the heat of the heating mechanism 40 is taken by the cooling water. Therefore, it is possible for the heating mechanism 40 to efficiently warm up the purification catalyst 38.

When the heating mechanism 40 is stopped because the engine 2 is being stopped and the end timing described above is reached, as illustrated in FIG. 15, the valve controller 52 switches the second valve 22 into the second state (a state where the second valve inflow flow path 100$f$ and the catalyst inflow flow path 100$n$ are communicated with each other and the second valve inflow flow path 100$f$ and the third valve inflow flow path 100$g$ are disconnected from each other), maintains the third valve 24 at the rotation angle indicated by "F" in FIG. 2, and starts driving of the water pump 10. Then, the cooling water discharged from the water pump 10 flows through the purification catalyst 38 via the oil pan upper 12, the branch chamber 14$a$, the cylinder head 16, the water delivery pipe 20, and the second valve 22. Thereby, heat is exchanged between the cooling water and the purification catalyst 38, and the cooling water is heated by the heat of the purification catalyst 38. The heated cooling water is stored in the refrigerant reservoir 42 through the third valve 24 and the water delivery pipe 34.

After a predetermined time elapses from when flowage (circulation) of the cooling water to the purification catalyst 38 is started, the valve controller 52 switches the second valve 22 into the first state and stops the water pump 10.

In this way, when the engine 2 is not started even though the purification catalyst 38 is warmed up, energy used to warm the purification catalyst 38 can be stored in the refrigerant reservoir 42.

On the other hand, when the heating mechanism 40 is stopped because of start of the engine 2, as illustrated in FIG. 16, if the temperature of the cooling water in the refrigerant reservoir 42, which is measured by the temperature sensor T5, exceeds the outside air temperature, the valve controller 52 controls the fourth valve 44 into the open state, switches the second valve 22 into the first state, maintains the third valve 24 at the rotation angle indicated by "F" in FIG. 2, and starts driving of the water pump 10. Then, the cooling water which is stored in the refrigerant reservoir 42 and whose temperature exceeds the outside air temperature is discharged from the water pump 10 and flows through the cylinder head 16 via the oil pan upper 12 and the branch chamber 14$a$. Also, the cooling water which is stored in the refrigerant reservoir 42 and whose temperature exceeds the outside air temperature is discharged from the water pump 10 and flows through the EGR cooler 30 via the oil pan upper 12.

Thereby, the cylinder head 16 can be warmed up by the cooling water. In other words, the cylinder head 16 can be warmed up by energy (heat) used to warm the purification catalyst 38.

When the temperature of the cooling water in the water delivery pipe 34 becomes higher than or equal to the first temperature threshold (50° C.), in the vehicle 1, the thermostat valve 36 becomes the open state and the cooling water flows as illustrated in FIG. 5.

When the engine 2 is driven and the cooling water flows through the engine 2 as illustrated in FIGS. 5 to 13, if the temperature of the purification catalyst 38 measured by the temperature sensor T6 is higher than or equal to a third temperature threshold (for example, deterioration temperature of the purification catalyst 38), the second valve 22 is switched into the second state. Then, the cooling water which has cooled the engine 2 flows through the purification catalyst 38. Thereby, it is possible to cool the purification catalyst 38 and suppress degradation of the purification catalyst 38.

First Modified Example

In the embodiment described above, a case where the warm-up device is included in the cooling mechanism 200 that cools the engine 2 is used as an example. However, the warm-up device may be a body separate from the cooling mechanism 200.

Figure 17:
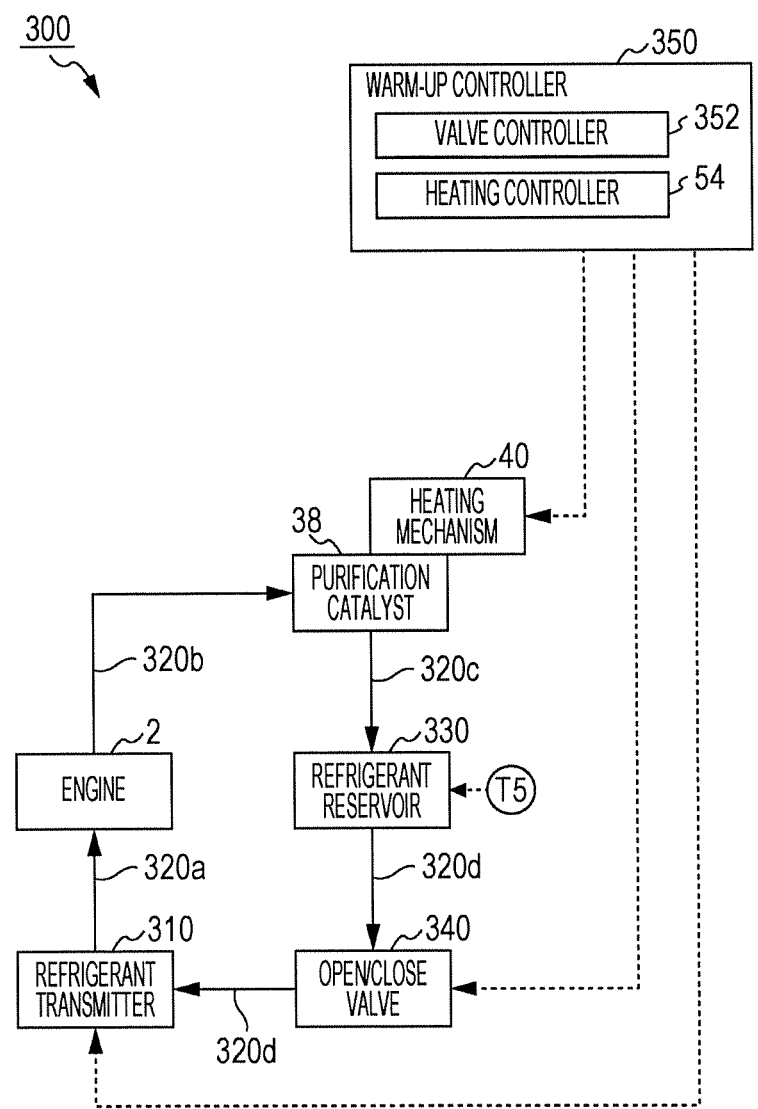
FIG. 17 is a diagram for explaining a warm-up device of a first modified example.

FIG. 17 is a diagram for explaining a warm-up device 300 of a first modified example. In FIG. 17, solid arrows indicate cooling flow paths 320 (indicated by 320a to 320d in FIG. 17), and dashed arrows indicate flows of signals. As illustrated in FIG. 17, the warm-up device 300 is provided with a refrigerant transmitter 310, the cooling flow paths 320, a refrigerant reservoir 330, an open/close valve 340, the heating mechanism 40, a warm-up controller 350, and the temperature sensor T5. The components that are substantially the same as those in the cooling mechanism 200 of the embodiment described above are denoted by the same reference numerals and the description thereof will be omitted.

The refrigerant transmitter 310 is composed of, for example, a pump. The refrigerant transmitter 310 is driven when power is supplied from a battery not illustrated in the drawings. The refrigerant transmitter 310 is coupled to an discharge flow path 320a and a suction flow path 320d. The refrigerant transmitter 310 ejects the cooling water flowing in from the suction flow path 320d to the discharge flow path 320a.

The engine 2 is coupled to the discharge flow path 320a and an engine ejection flow path 320b. The cooling water flowing into the inside of the engine 2 through the discharge flow path 320a is ejected to the engine ejection flow path 320b after flowing inside the engine 2.

The engine ejection flow path 320b and a catalyst ejection flow path 320c are coupled to the purification catalyst 38. The cooling water guided to the purification catalyst 38 through the engine ejection flow path 320b flows on an external wall of the purification catalyst 38 and then is ejected to the catalyst ejection flow path 320c.

The refrigerant reservoir 330 is coupled to the catalyst ejection flow path 320c and the suction flow path 320d. The refrigerant reservoir 330 stores the cooling water in a heat insulating manner. The refrigerant reservoir 330 is a container having a heat insulation structure.

The open/close valve 340 is a valve which is provided on the suction flow path 320d and can switch between an open state where the suction flow path 320d is opened and a closed state where the suction flow path 320d is shut off. In the open state, the open/close valve 340 ejects the cooling water flowing in from the engine ejection flow path 320b to the purification catalyst 38. On the other hand, in the closed state, the open/close valve 340 blocks the cooling water from flowing from the engine ejection flow path 320b into the purification catalyst 38 and prevents the cooling water from flowing into the purification catalyst 38.

The warm-up controller 350 is composed of a semiconductor integrated circuit including a central processing unit (CPU), a ROM where a program and the like are stored, and a RAM used as a work area. The temperature sensor T5 is coupled to the warm-up controller 350. The warm-up controller 350 controls the refrigerant transmitter 310, the open/close valve 340, and the heating mechanism 40 based on a signal transmitted from the temperature sensor T5 and a driving condition of the engine 2.

When the warm-up controller 350 performs control processing, the warm-up controller 350 functions as a valve controller 352 and the heating controller 54.

Before the engine 2 is started, the valve controller 352 controls open and closed states of the open/close valve 340 and controls a driving state of the refrigerant transmitter 310 based on a driving state of the heating mechanism 40.

When the heating mechanism 40 is driven before the engine 2 is started, the valve controller 352 controls the open/close valve 340 into the closed state and does not start driving of the refrigerant transmitter 310 (maintains a stopped state). Thereby, the cooling water does not flow around the purification catalyst 38, so that it is possible to suppress transfer of heat of the heating mechanism 40 (or heat of the purification catalyst 38 heated by the heating mechanism 40) to the cooling water. In other words, it is possible to suppress a situation in which the heat of the heating mechanism 40 is taken by the cooling water. Therefore, it is possible for the heating mechanism 40 to efficiently warm up the purification catalyst 38.

When the heating mechanism 40 is stopped because the engine 2 is being stopped and the end timing described above is reached, the valve controller 352 controls the open/close valve 340 into the open state and starts driving of the refrigerant transmitter 310. Then, the cooling water discharged from the refrigerant transmitter 310 flows through the purification catalyst 38 via the discharge flow path 320a, the engine 2, and the engine ejection flow path 320b. Thereby, heat is exchanged between the cooling water and the purification catalyst 38, and the cooling water is heated by the heat of the purification catalyst 38. The heated cooling water is stored in the refrigerant reservoir 330 through the catalyst ejection flow path 320c.

After a predetermined time elapses from when flowage (circulation) of the cooling water to the purification catalyst 38 is started, the valve controller 352 controls the open/close valve 340 into the closed state and stops the refrigerant transmitter 310.

In this way, when the engine 2 is not started even though the purification catalyst 38 is warmed up, energy used to warm the purification catalyst 38 can be stored in the refrigerant reservoir 330.

On the other hand, when the heating mechanism 40 is stopped because of start of the engine 2, if the temperature of the cooling water in the refrigerant reservoir 330, which is measured by the temperature sensor T5, exceeds the outside air temperature, the valve controller 352 controls the open/close valve 340 into the open state and starts driving of the refrigerant transmitter 310. Then, by the refrigerant transmitter 310, the cooling water which is stored in the refrigerant reservoir 330 and whose temperature exceeds the outside air temperature is discharged from the refrigerant transmitter 310, and flows through the engine 2 via the discharge flow path 320a.

Thereby, the engine 2 can be warmed up by the cooling water. In other words, the engine 2 can be warmed up by energy (heat) used to warm the purification catalyst 38.

Second Modified Example

FIG. 18 is a diagram for explaining a warm-up device 400 of a second modified example. In FIG. 18, solid arrows indicate cooling flow paths 420 (indicated by 420a to 420c in FIG. 18), and dashed arrows indicate flows of signals. As illustrated in FIG. 18, the warm-up device 400 is provided with the refrigerant transmitter 310, a cooling flow paths 420, the heating mechanism 40, a refrigerant reservoir 430, the open/close valve 340, a warm-up controller 450, and the temperature sensor T5. The components that are substantially the same as those in the cooling mechanism 200 of the embodiment described above are denoted by the same reference numerals and the description thereof will be omitted.

A discharge flow path 420a is coupled to the refrigerant transmitter 310 and engine 2 and guides the cooling water discharged from the refrigerant transmitter 310 to the engine 2. The cooling water flowing into the inside of the engine 2 through the discharge flow path 420a is ejected to an engine ejection flow path 420b after flowing inside the engine 2. The engine ejection flow path 420b is coupled to the refrigerant reservoir 430.

In the second modified example, the heating mechanism 40 surrounds the external wall of the purification catalyst 38. The refrigerant reservoir 430 surrounds an external wall of the heating mechanism 40. The refrigerant reservoir 430 stores the cooling water in a heat insulating manner. The refrigerant reservoir 430 is a container having a heat insulation structure.

The cooling water flows into the refrigerant reservoir 430 through the engine ejection flow path 420b. A suction flow path 420c is coupled to the refrigerant reservoir 430. The cooling water stored in the refrigerant reservoir 430 flows into the refrigerant transmitter 310 through the suction flow path 420c.

The warm-up controller 450 is composed of a semiconductor integrated circuit including a central processing unit (CPU), a ROM where a program and the like are stored, and a RAM used as a work area. The temperature sensor T5 is coupled to the warm-up controller 450. The warm-up controller 450 controls the refrigerant transmitter 310, the open/close valve 340, and the heating mechanism 40 based on a signal transmitted from the temperature sensor T5 and a driving condition of the engine 2.

When the warm-up controller 450 performs control processing, the warm-up controller 450 functions as a valve controller 452 and the heating controller 54.

Before the engine 2 is started, the valve controller 452 controls open and closed states of the open/close valve 340 and controls a driving state of the refrigerant transmitter 310 based on a driving state of the heating mechanism 40.

When the heating mechanism 40 is driven before the engine 2 is started, the valve controller 452 controls the open/close valve 340 into the closed state and does not start driving of the refrigerant transmitter 310 (maintains a stopped state). The cooling water stored in the refrigerant reservoir 430 and the heating mechanism 40 are brought into non-contact with each other by a movement mechanism not illustrated in the drawings. For example, a gap is formed between the cooling water in the refrigerant reservoir 430 and the heating mechanism 40. Thereby, it is possible to suppress transfer of heat of the heating mechanism 40 (or heat of the purification catalyst 38 heated by the heating mechanism 40) to the cooling water. In other words, it is possible to suppress a situation in which the heat of the heating mechanism 40 is taken by the cooling water. Therefore, it is possible for the heating mechanism 40 to efficiently warm up the purification catalyst 38.

When the heating mechanism 40 is stopped because the engine 2 is being stopped and the end timing described above is reached, the cooling water stored in the refrigerant reservoir 430 and the heating mechanism 40 are brought into contact with each other by a movement mechanism (a refrigerant heat exchanger). Thereby, heat is exchanged between the heating mechanism 40 (and the purification catalyst 38) and the refrigerant, and the heat-exchanged refrigerant is stored in the refrigerant reservoir 430.

In this way, when the engine 2 is not started even though the purification catalyst 38 is warmed up, energy used to warm the purification catalyst 38 can be stored in the refrigerant reservoir 430.

On the other hand, when the heating mechanism 40 is stopped because of start of the engine 2, if the temperature of the cooling water in the refrigerant reservoir 430, which is measured by the temperature sensor T5, exceeds the outside air temperature, the valve controller 452 controls the open/close valve 340 into the open state and starts driving of the refrigerant transmitter 310. Then, by the refrigerant transmitter 310, the cooling water which is stored in the refrigerant reservoir 430 and whose temperature exceeds the outside air temperature is discharged from the refrigerant transmitter 310, and flows through the engine 2 via the discharge flow path 420a.

Thereby, the engine 2 can be warmed up by the cooling water. In other words, the engine 2 can be warmed up by energy (heat) used to warm the purification catalyst 38.

While the embodiment of the present disclosure has been described with reference to the accompanying drawings, it is needless to say that the present disclosure is not limited to the embodiment. It is obvious that those skilled in the art can make various changes or modifications within the scope described in the claims, and of course, it is understood that these changes or modifications are within the technical scope of the present disclosure.

In the embodiment and the modified examples described above, an example is described where the heating mechanism 40 is composed of an electric heater and is a body separate from the purification catalyst 38. However, the configuration of the heating mechanism 40 is not limited as long as the heating mechanism 40 can heat the purification catalyst 38. The heating mechanism 40 may be, for example, an energization mechanism that energizes carrier itself of the purification catalyst 38 and heats the carrier.

In the embodiment and the modified examples described above, as the refrigerant flowing through the cooling flow paths 100, 320, and 420, the cooling water is used as an example. However, the type of refrigerant is not limited.

In the embodiment described above, an example is described where when the heating mechanism 40 is stopped by the heating controller 54 when the engine 2 is started, the cooling water is sent to the cylinder head 16 if the temperature of the cooling water stored in the refrigerant reservoir 42 is higher than the outside air temperature. In other words, as an object to be warmed up, the cylinder head 16 is used as an example. However, the object to be warmed up is not limited. For example, the cylinder block 14, the EGR cooler 30, or the transmission 32 may be the object to be warmed up.

In the embodiment described above, a configuration where the temperature sensor T6 is used, that is, a configuration where the temperature of the purification catalyst 38 is directly measured, is described as an example. However, the central controller 50 may estimate the temperature of the purification catalyst 38 based on the temperature of the exhaust gas flowing through the exhaust pipe. Alternatively, the central controller 50 may estimate the temperature of the purification catalyst 38 based on the engine load.

In the embodiment and the modified example s described above, as the engine 2, a gasoline engine is described as an example. However, the engine 2 may be a diesel engine.

According to the present disclosure, it is possible to effectively use the energy used to warm up the purification catalyst.

The invention claimed is:

1. A warm-up device comprising:
a pump configured to circulate a refrigerant through a circulation path;
a heater configured to heat a purification catalyst provided to an exhaust pipe, the purification catalyst being disposed on the circulation path;
a refrigerant reservoir disposed on the circulation path, the refrigerant reservoir being configured to store, in a heat insulating manner, the refrigerant whose heat is exchanged with the heated purification catalyst; and
a controller configured to control the pump and the heater,
wherein while the controller controls the heater to heat the purification catalyst, the controller stops driving of the pump such that the refrigerant does not circulate through the circulation path, and
wherein in response to the controller controlling the heater to stop the heating of the purification catalyst, the controller starts the driving of the pump to circulate the refrigerant through the circulation path such that the refrigerant that exchanged the heat with the heated purification catalyst is transmitted to the refrigerant reservoir and the refrigerant in the refrigerant reservoir is transmitted to an object to be warmed up.

2. The warm-up device according to claim 1, wherein the controller starts the driving of the heater at a predetermined start timing before an engine is started and stops the driving of the heater when the engine is being stopped and a predetermined end timing is reached.

3. The warm-up device according to claim 2, further comprising:
a refrigerant heat exchanger,
wherein the heater, the purification catalyst, and the refrigerant heat exchanger are disposed inside the refrigerant reservoir,
wherein the refrigerant heat exchanger is disposed between the refrigerant stored in the refrigerant reservoir and the heater or between the refrigerant stored in the refrigerant reservoir and the purification catalyst,
wherein the controller controls the refrigerant heat exchanger to block the refrigerant from exchanging heat with the heater or the purification catalyst while controlling the heater to heat the purification catalyst, and
wherein the controller controls the refrigerant heat exchanger to allow the refrigerant to exchange heat with the heater or the purification catalyst when the controller controls the heater to stop the heating of the purification catalyst in response to the engine being stopped and the end timing being reached.

4. The warm-up device according to claim 1, wherein the controller controls the pump to circulate the refrigerant through the circulation path such that the refrigerant is transmitted to the object to be warmed up when the controller determines that a temperature of the refrigerant stored in the refrigerant reservoir exceeds outside air temperature.

5. The warm-up device according to claim 2, wherein the controller controls the pump to circulate the refrigerant through the circulation path such that the refrigerant is transmitted to the object to be warmed up when the controller determines that a temperature of the refrigerant stored in the refrigerant reservoir exceeds outside air temperature.

6. The warm-up device according to claim 3, wherein the controller controls the pump to circulate the refrigerant through the circulation path such that the refrigerant is transmitted to the object to be warmed up when the controller determines that a temperature of the refrigerant stored in the refrigerant reservoir exceeds outside air temperature.

7. The warm-up device according to claim 2, wherein, when the engine is being stopped and the predetermined end timing is reached, the controller drives the pump for a predetermined time to circulate the refrigerant through the circulation path such that the refrigerant that exchanged the heat with the heated purification catalyst is transmitted to the refrigerant reservoir.

* * * * *